(12) United States Patent
Guo et al.

(10) Patent No.: US 8,539,483 B2
(45) Date of Patent: Sep. 17, 2013

(54) COMPUTER AND CONTROL METHOD FOR INTERRUPTING MACHINE OPERATION

(75) Inventors: Zhaogong Guo, Kawasaki (JP); Naoki Nishiguchi, Kawasaki (JP); Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 12/721,464

(22) Filed: Mar. 10, 2010

(65) Prior Publication Data

US 2010/0235557 A1 Sep. 16, 2010

(30) Foreign Application Priority Data

Mar. 11, 2009 (JP) .................................. 2009-58261

(51) Int. Cl.
G06F 9/455 (2006.01)
G06F 21/00 (2013.01)

(52) U.S. Cl.
USPC .................................................. 718/1; 711/6

(58) Field of Classification Search
USPC ................................................. 718/1; 711/6
See application file for complete search history.

(56) References Cited

U.S. PATENT DOCUMENTS

| | | | |
|---|---|---|---|
| RE39,837 E * | 9/2007 | Marisetty ...................... | 713/324 |
| 7,334,142 B2 | 2/2008 | Hack | |
| 7,792,026 B2 * | 9/2010 | Wang et al. .................... | 370/230 |
| 2002/0083110 A1 * | 6/2002 | Kozuch et al. ................... | 709/1 |
| 2005/0268078 A1 * | 12/2005 | Zimmer et al. .................. | 713/1 |
| 2006/0085794 A1 | 4/2006 | Yokoyama | |
| 2009/0217072 A1 * | 8/2009 | Gebhart et al. ................ | 713/330 |
| 2009/0293056 A1 * | 11/2009 | Ferris ................................ | 718/1 |
| 2010/0031258 A1 * | 2/2010 | Takano et al. ...................... | 718/1 |
| 2010/0115315 A1 * | 5/2010 | Davis et al. ..................... | 713/323 |
| 2010/0218014 A1 * | 8/2010 | Bozek et al. .................... | 713/320 |
| 2011/0010713 A1 * | 1/2011 | Matsumoto et al. .............. | 718/1 |
| 2011/0055602 A1 * | 3/2011 | Kamay et al. ................. | 713/320 |
| 2011/0231408 A1 * | 9/2011 | Sasaki et al. ................... | 707/748 |
| 2011/0239038 A1 * | 9/2011 | Ito ..................................... | 714/3 |

FOREIGN PATENT DOCUMENTS

| | | |
|---|---|---|
| EP | 1134656 | 9/2001 |
| JP | 1-129315 A | 5/1989 |
| JP | 07-225694 | 8/1995 |
| JP | 8-202475 A | 8/1996 |
| JP | 11-348379 A | 12/1999 |
| JP | 2001-43098 | 2/2001 |
| JP | 2001-290568 A | 10/2001 |
| JP | 2005-209198 | 8/2005 |
| JP | 2006-113767 | 4/2006 |
| WO | WO-2008/149412 A1 | 12/2008 |

OTHER PUBLICATIONS

Japanese Office Action mailed Apr. 30, 2013 for corresponding Japanese Application No. 2009-058261, with Partial English-language Translation.

* cited by examiner

Primary Examiner — Emerson Puente
Assistant Examiner — Willy W Huaracha
(74) Attorney, Agent, or Firm — Fujitsu Patent Center

(57) ABSTRACT

A computer that receives a first instruction for interrupting or stopping operation of the virtual machine; that obtains a duration time corresponding to the virtual machine for which the first instruction is received; that determines whether a second instruction for operating the virtual machine has been received during the obtained duration time; and that determines whether to output a third instruction for interrupting or stopping operation of the computer based at least on whether the second instruction for operating the virtual machine has been received during the obtained duration time.

4 Claims, 29 Drawing Sheets

FIG. 3

SETTING FILE  151

| VMID | SETTING | |
| --- | --- | --- |
| | TRANSITION PERIOD | STATE |
| VM21 | 30 MINUTES | INTERRUPTED |
| VM22 | 20 MINUTES | INTERRUPTED |
| VM23 | 50 MINUTES | STOPPED |

FIG. 4

TIME FILE  152

| VMID | DURATION TIME |
| --- | --- |
| VM21 | 3 MINUTES |
| VM22 | 8 MINUTES |
| VM23 | 2 MINUTES |

FIG. 8

TIME FILE  152

| VMID | DURATION TIME | |
|---|---|---|
| | INTERRUPTION DURATION TIME | STOP DURATION TIME |
| VM21 | 3 MINUTES | 2 MINUTES |
| VM22 | 8 MINUTES | 5 MINUTES |
| VM23 | 2 MINUTES | 1 MINUTE |

| | MON, DECEMBER 15 | | TUE, DECEMBER 16 | | WED, DECEMBER 17 | | ... |
|---|---|---|---|---|---|---|---|
| VMID | TIME | STATE | TIME | STATE | TIME | STATE | ... |
| VM21 | 9:00 ~ 11:00 | OPERATING | 11:00 ~ 11:10 | INTERRUPTED | 11:10 ~ 11:30 | OPERATING | ... |
| VM22 | 9:00 ~ 12:00 | OPERATING | 12:00 ~ 13:10 | INTERRUPTED | 13:10 ~ 14:30 | OPERATING | ... |
| VM23 | 10:00 ~ 11:50 | OPERATING | 11:50 ~ 12:30 | STOPPED | 12:30 ~ 15:30 | OPERATING | ... |

FIG. 14

| VMID | DURATION TIME | |
|---|---|---|
| | AVERAGE INTERRUPTION DURATION TIME | AVERAGE STOP DURATION TIME |
| VM21 | 5 MINUTES | 3 MINUTES |
| VM22 | 7 MINUTES | 5 MINUTES |
| VM23 | 3 MINUTES | 1 MINUTE |

Tabs: SUNDAY / MONDAY / TUESDAY ··· 152
Sub-tabs: MONDAY, WEEKDAY / MONDAY, HOLIDAY

COMPUTER AND CONTROL METHOD FOR INTERRUPTING MACHINE OPERATION

CROSS-REFERENCE TO RELATED APPLICATION(S)

This application is based upon and claims the benefit of priority of prior Japanese Patent Application No. JP2009-058261, filed on Mar. 11, 2009, the entire content of which is incorporated herein by reference.

BACKGROUND OF THE INVENTION

1. Field

Embodiments of the present invention relate to a computer program (hereinafter, "program") which is used to control a virtual machine operating in a computer, the computer, and a control method.

2. Description of the Related Art

In recent years, reduction of power consumption of machines, such as computers, in which virtual machines operate has been attempted (refer to Japanese Unexamined Patent Application Publication No. 2005-209198, for example). In general, power consumption is reduced by stopping power supply to a computer when operations of all virtual machines are stopped.

SUMMARY

It is an aspect of the embodiments discussed herein to provide a computer that receives a first instruction for interrupting or stopping operation of the virtual machine; that obtains a duration time corresponding to the virtual machine for which the first instruction is received; that determines whether a second instruction for operating the virtual machine has been received during the obtained duration time; and that determines whether to output a third instruction for interrupting or stopping operation of the computer based at least on whether the second instruction for operating the virtual machine has been received during the obtained duration time. It is to be understood that both the foregoing summary description and the following detailed description are exemplary and explanatory and are not restrictive of the invention, as claimed.

BRIEF DESCRIPTION OF THE DRAWINGS

FIG. 3 illustrates record layout of a setting file;

FIG. 4 illustrates record layout of a time file;

FIG. 8 illustrates record layout of the time file;

FIG. 13 illustrates record layout of a history file;

FIG. 14 illustrates record layout of a time file according to the third embodiment;

DETAILED DESCRIPTION OF THE EMBODIMENTS

Conventionally, reduction of power consumption causes somewhat less usability, hence both of them are not sufficiently attained at substantially the same time.

In a case where a virtual machine is activated immediately after a computer is stopped, processing of activating the computer and the virtual machine is required to be performed again, and therefore, a user has to wait during such processing.

Embodiments disclosed below have been made to improve usability as follows. Even when the virtual machine is interrupted or stopped, the user immediately uses the virtual machine again since the computer is not immediately interrupted or stopped but continuously operates for a certain duration time.

In a case where any operation is not performed within the duration time, it is determined that it is unlikely that the user uses the computer again, and the operation of the computer is stopped. In this way, power consumption is reduced.

According to an aspect of an apparatus disclosed below, even when an instruction for interrupting or stopping a virtual machine operating in the computer is received, the operation of the computer is continued until the duration time which is an arbitrary period of time is elapsed.

By this, even when the user intends to use the virtual machine again after interruption or stop of the computer, the user may immediately use the computer again.

Furthermore, since the operation of the computer is stopped after the duration time is elapsed, reduction of power consumption is also achieved.

Figure 1:
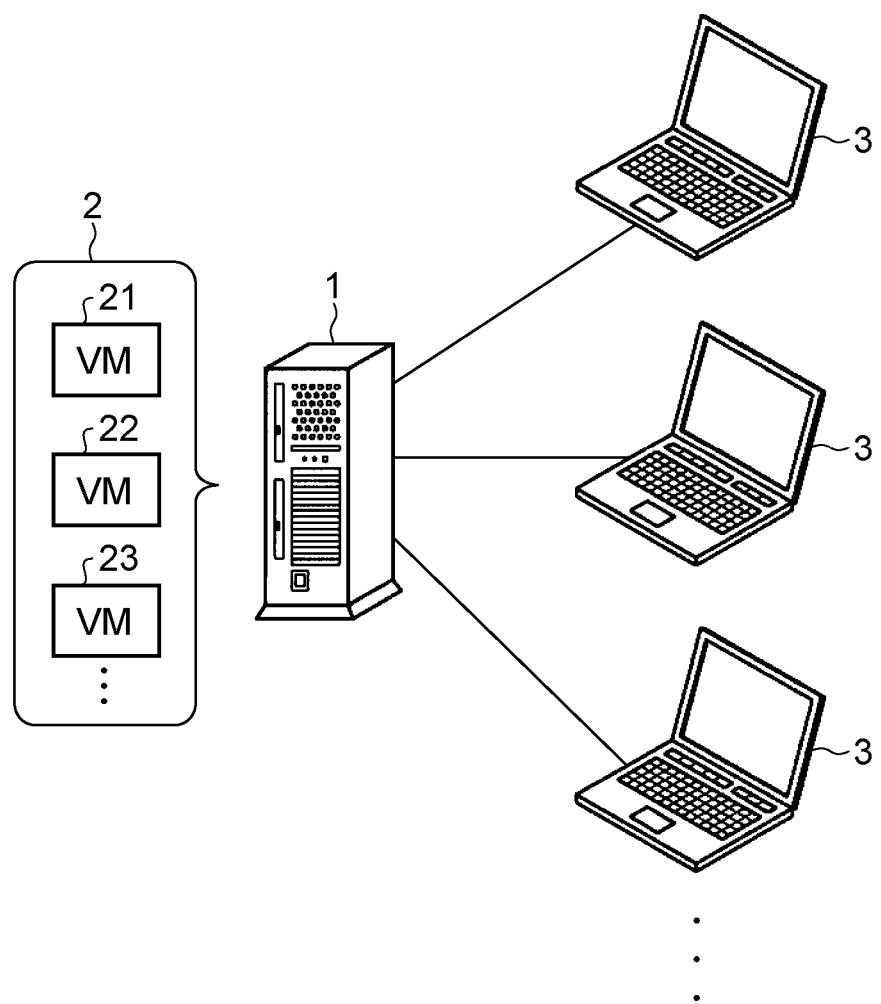
FIG. 1 illustrates an outline of a control system.

FIG. 1 illustrates an outline of a control system.

The control system includes a computer 1, virtual machines 2, and terminal apparatuses 3.

The computer 1 is a server computer, for example, and controls a plurality of virtual machines (hereinafter, referred to as "VMs") 21, 22, 23 and so on (hereinafter, collectively denoted by "2" as applicable).

The terminal apparatuses 3 have a function of communicating with the computer 1 and a function of displaying outputs from the virtual machines which are transmitted from the computer 1 using a display device. Inexpensive personal computers which do not include mass storage media therein, for example, may be used as the terminal apparatuses 3.

Hereinafter, the computer 1 is referred to as a physical machine 1, and the terminal apparatuses 3 are collectively referred to as a personal computer 3 where appropriate.

The personal computer 3 is connected to the physical machine 1 through a USB (Universal Serial Bus) cable or a communication network such as the Internet or a LAN (Local Area Network). Information is transmitted and received between the physical machine 1 and the personal computer 3 in accordance with a predetermined protocol.

In this embodiment, it is assumed that the personal computer 3 is connected to the physical machine 1 through a LAN.

A user uses the personal computer 3 to activate the VMs 2 through the physical machine 1.

The plurality of VMs 21, 22, 23 and so on operate in the physical machine 1.

Although a case where the physical machine 1 controls the three VMs 21 to 23 is described as an example hereinafter, the number of VMs is not limited to this.

Next, an outline of this embodiment will be described.

When the VM 21 in operation receives an interruption instruction or a stop instruction, the VM 21 enters an "interruption state" or a "stop state".

However, operation of the physical machine 1 is not immediately interrupted or stopped but is continued for a certain duration time (for three minutes, for example).

The operation of the physical machine 1 is stopped when the VM 21 in which operation thereof is stopped after the duration time has elapsed and the other VMs 22 and 23 are in an "interruption state" or a "stop state" and duration times for respective VMs 21 to 23 are elapsed.

Figure 2:
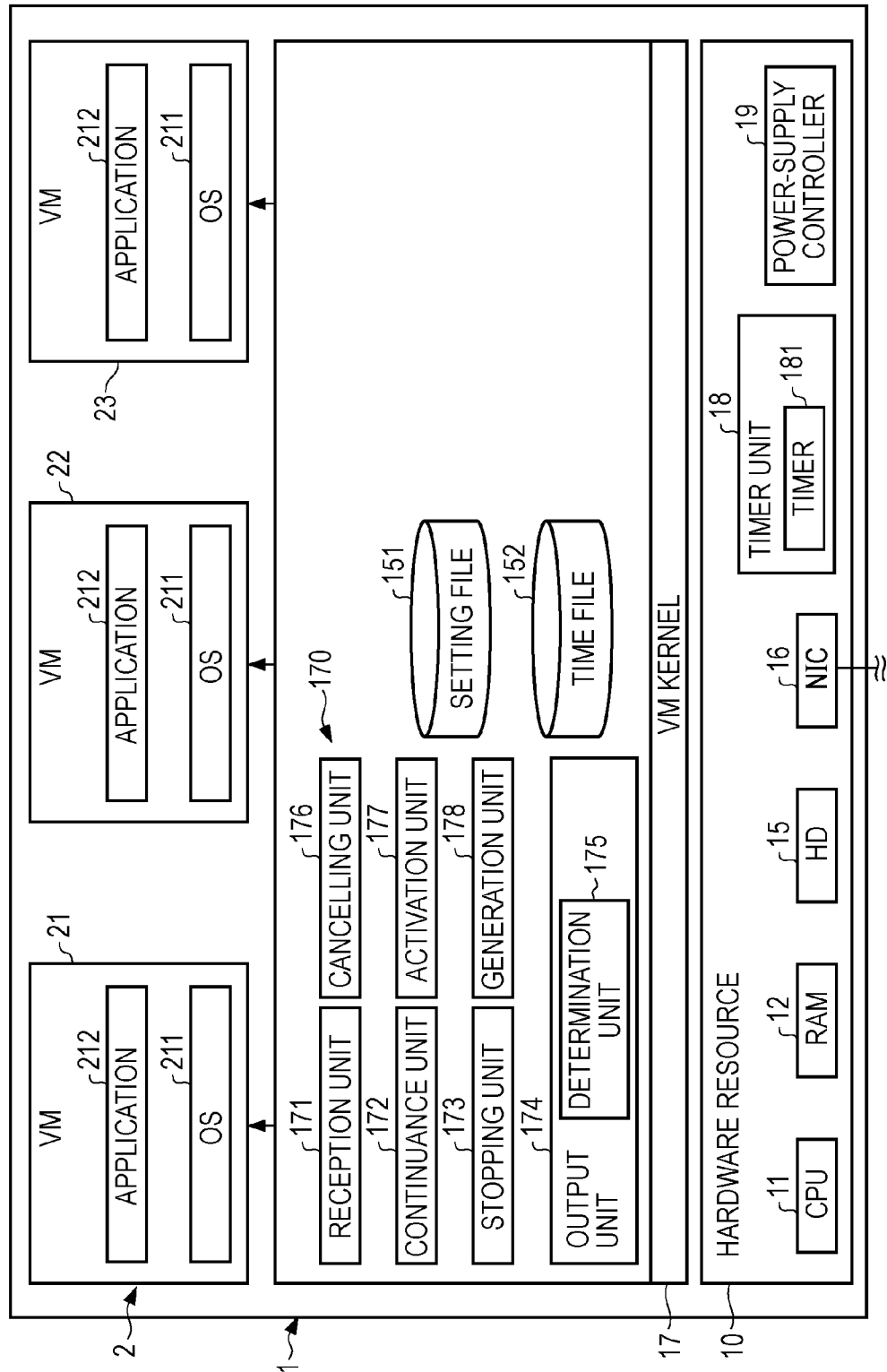
FIG. 2 illustrates hardware and software of a physical machine and VMs.

FIG. 2 illustrates hardware and software of the physical machine 1 and the VMs 2.

The physical machine 1 includes a hardware resource 10 and a VM kernel 17.

The hardware resource 10 includes a CPU (Central Processing Unit) 11, a RAM (Random Access Memory) 12, a hard disk (hereinafter referred to as an HD) 15, an NIC (Network Interface Card) 16, a timer unit 18, and a power-supply controller 19.

The hardware resource 10 is controlled by the VM kernel 17 which is virtualization software.

The CPU 11 controls various hardware units connected through a bus (not shown) in accordance with instructions issued by the VM kernel 17 and a control module 170 included in the VM kernel 17.

The RAM 12 serving as a storage unit includes an SRAM (Static RAM), a DRAM (Dynamic RAM), and a flash memory.

The RAM 12 temporarily stores various data generated when the CPU 11 executes various programs including the VM kernel 17.

The HD 15 serving as a storage unit stores files generated by the VMs 2 and various data to be stored in accordance with instructions issued from the VM kernel 17.

The NIC 16 such as an Ethernet card transmits information to and receives information from the personal computer 3 or other Web servers, not shown, for example, in accordance with an HTTP (Hyper Text Transfer Protocol).

The timer unit 18 includes a timer 181 and outputs time information to the CPU 11.

Note that although date information may be omitted for simplicity of description in this embodiment, the time information may include the date information.

The power-supply controller 19 controls supply of electric power to the physical machine 1 and stop of the supply of the electric power to the physical machine 1.

The control module 170 which operates in cooperation with the VM kernel 17 performs various processes including processes of configuring the VMs 21 to 23 and power-supply management.

The control module 170 includes a reception unit 171, a continuance unit 172, a stopping unit 173, an output unit 174, a determination unit 175, a cancelling unit 176, an activation unit 177, and a generation unit 178, and is executed after being loaded in the RAM 12.

The reception unit 171 receives an interruption instruction or a stop instruction by the user.

The continuance unit 172 continues operation of the physical machine 1 for a certain duration time so that the physical machine 1 is not interrupted or stopped.

The stopping unit 173 interrupts or stops operation of a specified VM 2.

The output unit 174 interrupts or stops the operation of the physical machine 1.

The determination unit 175 determines whether the operation of the physical machine 1 may be interrupted or stopped.

The cancelling unit 176 waits for an activation instruction issued by the user and outputs the activation instruction to the VM 2.

The activation unit 177 activates the physical machine 1 and the VM 2.

The generation unit 178 monitors an operation performed by the user and generates an interruption instruction or a stop instruction to be supplied to the reception unit 171.

The RAM 12 or the HD 15 includes a setting file 151 and a time file 152.

Note that, although hypervisor-type virtualization software in which the VM kernel 17 directly operates in the hardware resource 10 is used as an example in this embodiment, the present invention is not limited to this.

A host-type virtualization software in which virtualization software operates in an operating system such as Windows (registered trademark) or Linux (registered trademark) may be used.

The user who intends to use the VM 21 operates the personal computer 3 in order to activate the physical machine 1.

The personal computer 3 outputs activation instruction to the physical machine 1.

Furthermore, the personal computer 3 outputs identification information (hereinafter referred to as a "VMID") used to identify a desired one of the VMs 2 and an instruction for activating the VM 2 to the physical machine 1.

In addition, information used to identify the personal computer 3 such as an IP address or a MAC address of the personal computer 3 is associated with the desired VM 2 to be activated in the physical machine 1 in advance.

Then, after the physical machine 1 is activated, the VM 2 (VM 21, here) which is associated with the personal computer 3 which transmitted the activation instruction to the physical machine 1 may be activated.

In this case, processing of outputting identification information of the desired VM 2 to be activated may be omitted.

Furthermore, information used to identify the user who uses the personal computer 3 may be associated with the desired VM 2 to be activated in advance in the physical machine 1, and the information used to identify the user may be transmitted to the physical machine 1 after the physical machine 1 is activated.

Note that the association method is merely an example, and another method may be employed.

Hereinafter, a case where the VM 21 is to be activated will be described as an example in this embodiment.

The NIC 16 corresponds to Wake-On-Lan. When receiving an instruction on activation of the physical machine 1, the NIC 16 outputs the activation instruction to the power-supply controller 19.

Note that the personal computer 3 outputs, to the NIC 16, a magic packet used to power on the physical machine 1.

The power-supply controller 19 supplies electric power from an AC power source, not shown, to the physical machine 1.

In this way, the physical machine 1 is activated, and in addition, the VM kernel 17 and the control module 170 are also activated.

The activation unit 177 activates the VM 21.

The VM 21 operates under control of the VM kernel 17 and executes an OS (Operating System) 211 which has been installed in the VM 21.

Furthermore, the VM 21 executes various applications 212 under control of the OS 211.

The VM 21 outputs screen information to the personal computer 3 through the NIC 16.

Similarly, another user may use the VM 22 through another computer 3.

Subsequently, the activation unit 177 activates the VM 22.

Next, processing of interrupting or stopping operation of the VM 21 will be described.

The interruption of the operation of the VM 21 corresponds to a state in which information included in a region in the RAM 12 which is used by the VM 21 is stored in the HD 15 and the VM 21 enters a hibernation state (or in a halt state).

In this case, the region included in the RAM 12 used by the VM 21 is cleared.

In a case where the VM 21 is activated again after the hibernation state (or the halt state), the information which has been stored in the HD 15 is stored in the region in the RAM 12 and work which had been done by the interruption is restored.

Note that, although the hibernation state corresponds to an "interruption state" in this embodiment, the present invention is not limited to this.

Alternatively, the interruption of the operation of the VM 21 may correspond to a state in which the information included in the region in the RAM 12 used by the VM 21 is maintained in the RAM 12 and the VM 21 enters in a suspending state (or a sleep state or a standby state) in which power is supplied from the power-supply controller 19 to the RAM 12.

In a case where the VM 21 is activated again after the suspending state (or the sleep state or the standby state), the work which had been done by the interruption is immediately restored by using the information included in the region in the RAM 12 by the VM 21.

Stop of the operation of the VM 21 corresponds to a state in which the OS 211 and all the applications 212 used by the VM 21 are terminated, the information included in the region in the RAM 12 is not stored in the HD 15 but cleared, and the VM 21 enters a "stop state".

FIG. 3 illustrates record layout of the setting file 151.

The setting file 151 stores information on transition periods which are periods of time required for switching to the "interruption state" or the "stop state".

The transition periods are associated with the VMs 2.

The setting file 151 includes a VMID field, a transition period field, and a state field.

The VMID field stores information used to identify the VMs 2.

Note that a VMID of the VM 21 is "VM 21", a VMID of the VM 22 is "VM 22", and a VMID of the VM 23 is "VM 23".

The state field stores states to be switched from an "operating state" when the VMs 2 do not receive any operation instruction from the personal computer 3 for a predetermined period of time.

Furthermore, the transition period field stores transition periods required for transition from the "operating state" to the "interruption state" or the "stop state" when the VMs 2 do not receive any operation instruction.

In a case where the VM 21 does not receive any operation instruction from the personal computer 3 for 30 minutes, for example, the "operating state" is switched to the "interruption state".

Furthermore, in a case where the VM 23 does not receive any operation instruction from the personal computer 3 for 50 minutes, the "operating state" is switched to the "stop state".

Note that content stored in the setting file 151 may be changed using the personal computer 3 where appropriate.

FIG. 4 illustrates record layout of the time file 152.

The time file 152 includes a VMID field and a duration time field, for example.

The duration time field stores periods of time in which the physical machine 1 continuously operates after an interruption instruction or a stop instruction is received. The periods of time correspond to VMIDs.

In an example of FIG. 4, after an interruption instruction or a stop instruction is received from the VM 21, the "operating state" of the physical machine 1 is continued for three minutes (hereinafter, the term "continued" is replaced by a term "maintained" where appropriate).

Note that content stored in the time file 152 may be changed using the personal computer 3 where appropriate.

In order to maintain the operation of the physical machine 1, the states of the VMs 2 are brought to an "interruption/maintenance state" or a "stop/maintenance state" for a duration time for an interruption or a duration time for a stop, and then, brought to an "interruption state" or a "stop state" after the corresponding duration time is elapsed for individual VMs 2.

The operation of the physical machine 1 is not interrupted or stopped as long as all the VMs 2 are brought in the "interruption state" or the "stop state".

That is, once all the VMs 2 exit the "interruption/maintenance state" or the "stop/maintenance state" and all the VMs 2 enter the "interruption state" or the "stop state", the operation of the physical machine 1 is interrupted or stopped.

The generation unit 178 monitors an operation instruction output from the personal computer 3 through the NIC 16 and determines whether a period of time in which any operation instruction is not output exceeds a certain transition period stored in the setting file 151.

When the determination is affirmative, an interruption instruction or a stop instruction is supplied to the reception unit 171.

Specifically, the generation unit 178 obtains the transition period set for one of the VMs 2 to be monitored and refers to an output from the timer unit 18 at arbitrary time intervals.

Then, when it is determined that the period of time in which any instruction for operating the VM 2 is not output exceeds the transition period, the generation unit 178 outputs an instruction corresponding to a state which has been read.

For example, the generation unit 178 outputs an instruction for interrupting the operation of the VM 21 to the reception unit 171 after a transition period of 30 minutes has elapsed.

Note that, although, as an example of the interruption instruction or the stop instruction in this embodiment, a determination as to whether a period of time in which an instruction for operating the VMs 2 is not issued has been elapsed is used as a trigger, this is merely an example, and the present invention is not limited to this.

For example, when the personal computer 3 outputs an interruption instruction or a stop instruction to the OS 211, the OS 211 may output an interruption instruction or a stop instruction to the reception unit 171.

The reception unit 171 receives the instruction for interrupting or stopping the operation of the VM 21, and outputs the interruption instruction or the stop instruction to the stopping unit 173 along with the VMID of the VM 21.

The stopping unit 173 outputs the interruption instruction or the stop instruction to the VM 21 corresponding to the VMID.

The operation of the VM 21 is interrupted or stopped in accordance with the interruption instruction or the stop instruction.

After the interruption instruction or the stop instruction is output, the stopping unit 173 outputs, to the continuance unit 172, the VMID corresponding to the VM 2 in which the operation thereof is to be interrupted or stopped and information representing that the interruption instruction or the stop instruction has been output.

When the interruption instruction is output, the VM kernel 17 stores an "interruption/maintenance state" as the state of the VM 21. When the stop instruction is output, the VM kernel 17 stores a "stop/maintenance state" as the state of the VM 21.

The continuance unit 172 refers to the time file 152, and reads a duration time corresponding to the VMID of the VM 21.

The continuance unit 172 refers to an output from the timer unit 18 and waits for an activation instruction for operating the VM 21 corresponding to the VMID for the read duration time after the interruption instruction or the stop instruction is received.

If the activation instruction is not issued, the continuance unit 172 changes the state of the VM 21 from the "interruption/maintenance state" or the "stop/maintenance state" to an "interruption state" or a "stop state". The VM kernel 17 stores these states.

The output unit 174 includes the determination unit 175 which obtains states of the VMs 21 to 23 determined from among an "operating state", an "interruption state", "stop state", an "interruption/maintenance state" and the "stop/maintenance state" from the VM kernel 17 and which determines whether an instruction for interrupting or stopping the operation of the physical machine 1 has been issued.

In this embodiment, it is determined whether the VM 22 having the VMID of "VM 22" and the VM 23 having the VMID of "VM 23" are interrupted or stopped.

Specifically, the determination unit 175 makes the determination by requesting the VM kernel 17 which manages the states of the VMs 2 to transmit the states of the VMs 2.

Since the VMs 21 and 22 are in the "interruption state" and the VM 23 is in the "stop state", a determination in which the physical machine 1 is to be interrupted is transmitted to the output unit 174.

When receiving a result of the determination from the determination unit 175, the output unit 174 outputs an instruction for interrupting the operation of the physical machine 1 or an instruction for stopping the operation of the physical machine 1.

When the VM kernel 17 received the instruction for interrupting or stopping the operation of the physical machine 1, a program which is currently performed is terminated, and the operation of the physical machine 1 is interrupted or stopped.

Figure 5:
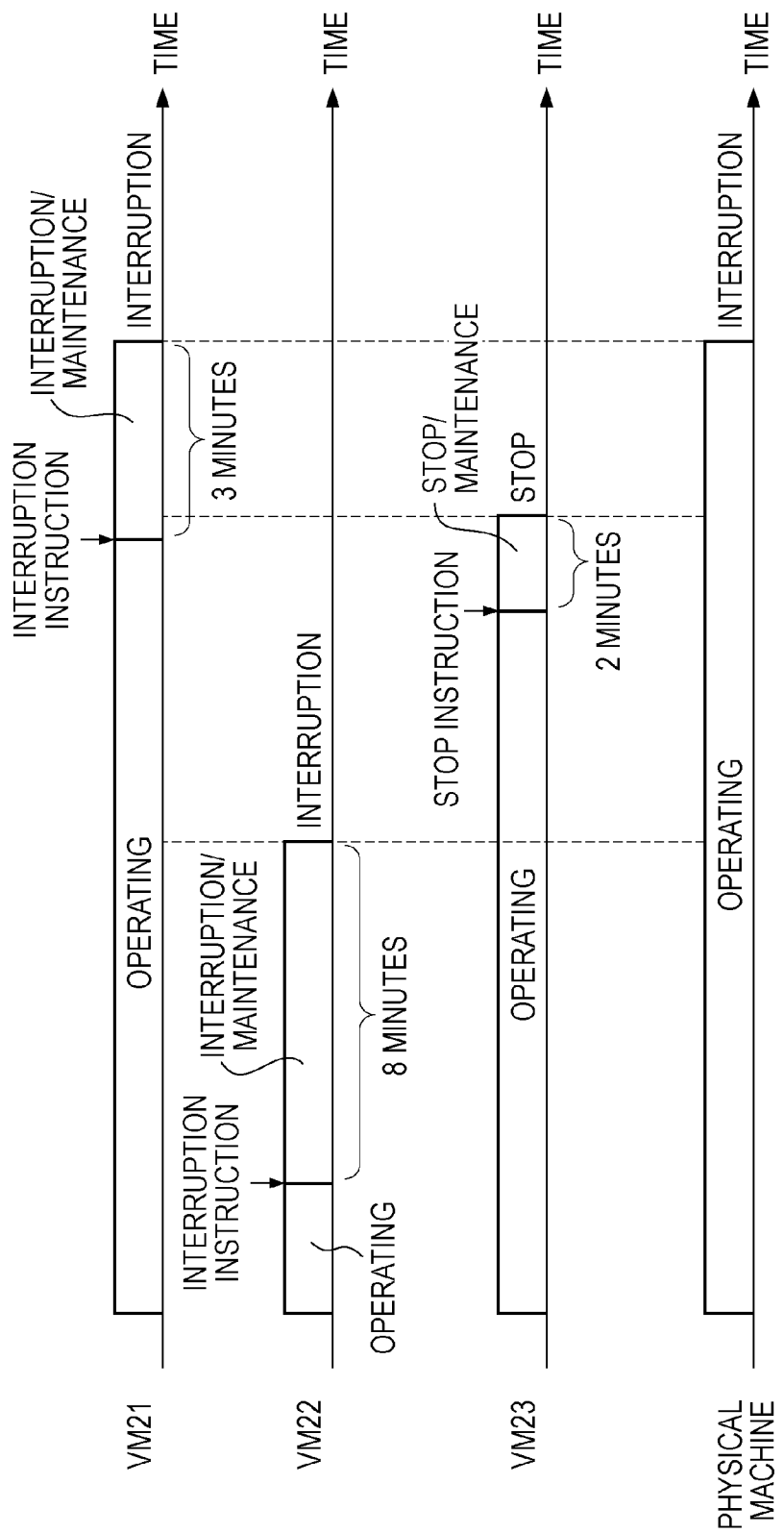
FIG. 5 illustrates transition of states of the VMs and the physical machine.

FIG. 5 illustrates transition of states of the VMs 2 and the physical machine 1.

In FIG. 5, axes of abscissa denote time.

In FIG. 5, temporal changes of the states of the VMs 21 to 23 and the physical machine 1 are shown from above. The states of the VMs 21 to 23 includes an "operating state", an "interruption state", a "stop state", an "interruption/maintenance state", and a "stop/maintenance state". The state of the physical machine 1 including an "operating state", an "interruption state", and a "stop state".

In this example, first, the reception unit 171 receives an instruction for interrupting operation of the VM 22, the stopping unit 173 interrupts the operation of the VM 22, and the VM 22 is brought to the "interruption/maintenance state".

The continuance unit 172 waits for an activation instruction to be supplied from the personal computer 3 for eight minutes.

If an activation instruction is not supplied for eight minutes, information representing an "interruption state" is supplied to the determination unit 175.

The determination unit 175 determines that operation of the physical machine 1 should not be interrupted or stopped since the VM 21 and the VM 23 are in an "operating state".

In this case, since the output unit 174 does not output an instruction for stopping the operation of the physical machine 1, the physical machine 1 maintains the "operating state".

Next, the reception unit 171 receives an instruction for stopping operation of the VM 23, the stopping unit 173 stops the operation of the VM 23, and the VM 23 is brought to a "stop/maintenance state".

The continuance unit 172 waits for an activation instruction to be supplied from the personal computer 3 for two minutes.

If an activation instruction is not supplied for two minutes, information representing a "stop state" is supplied to the determination unit 175.

The determination unit 175 determines that the operation of the physical machine 1 should not be interrupted or stopped since the VM 21 is in an "interruption/maintenance state".

In this case, since the output unit 174 does not output an instruction for stopping the operation of the physical machine 1, the physical machine 1 maintains the "operating state".

Finally, the reception unit 171 receives an instruction for interrupting operation of the VM 21, the stopping unit 173 interrupts the operation of the VM 21, and the VM 21 is brought to an "interruption/maintenance state".

The continuance unit 172 waits for an activation instruction to be supplied from the personal computer 3 for three minutes.

If an activation instruction is not supplied for three minutes, information representing an "interruption state" is supplied to the determination unit 175.

The determination unit 175 determines that the operation of the physical machine 1 may be interrupted since the VM 21 is in the "interruption state", the VM 22 is the "stop state", and the VM 23 is in the "interruption state".

The output unit 174 outputs an instruction for interrupting the physical machine 1 in response to a result of the determination of the determination unit 175.

Although the case where the output unit 174 outputs the instruction for interrupting the operation of the physical machine 1 after the duration times are elapsed is described as an example in this embodiment, the present invention is not limited to this.

The output unit 174 may output an instruction for stopping the operation of the physical machine 1 so that the operation of the physical machine 1 is stopped.

The physical machine 1 enters the "interruption state" or the "stop state" in response to the interruption instruction or the stop instruction output from the output unit 174.

Note that when the physical machine 1 enters the "interruption state", the power-supply controller 19 is at least in a hibernation state (or a halt state) in which information included in the RAM 12 is stored in the HD 15 or a suspending state (or a sleep state or a standby state) in which electric power is kept supplying to the RAM 12.

Furthermore, in the "stop state", the power-supply controller 19 stops supplying electric power to the physical machine 1 except for a case where a Wake-On-Lan function is used.

Figure 6:
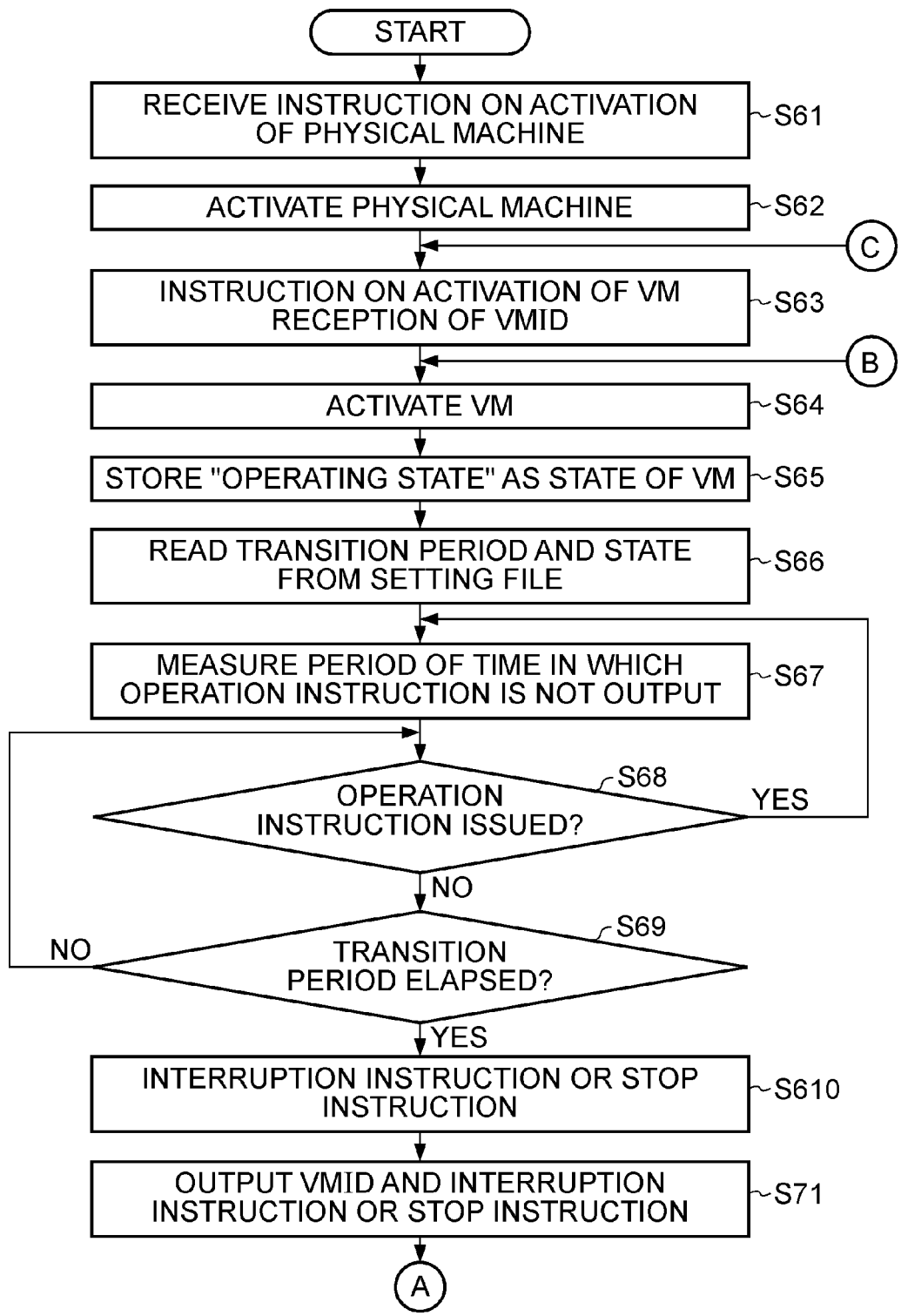
FIG. 6 is a flowchart illustrating a procedure of control processing.
Figure 7:
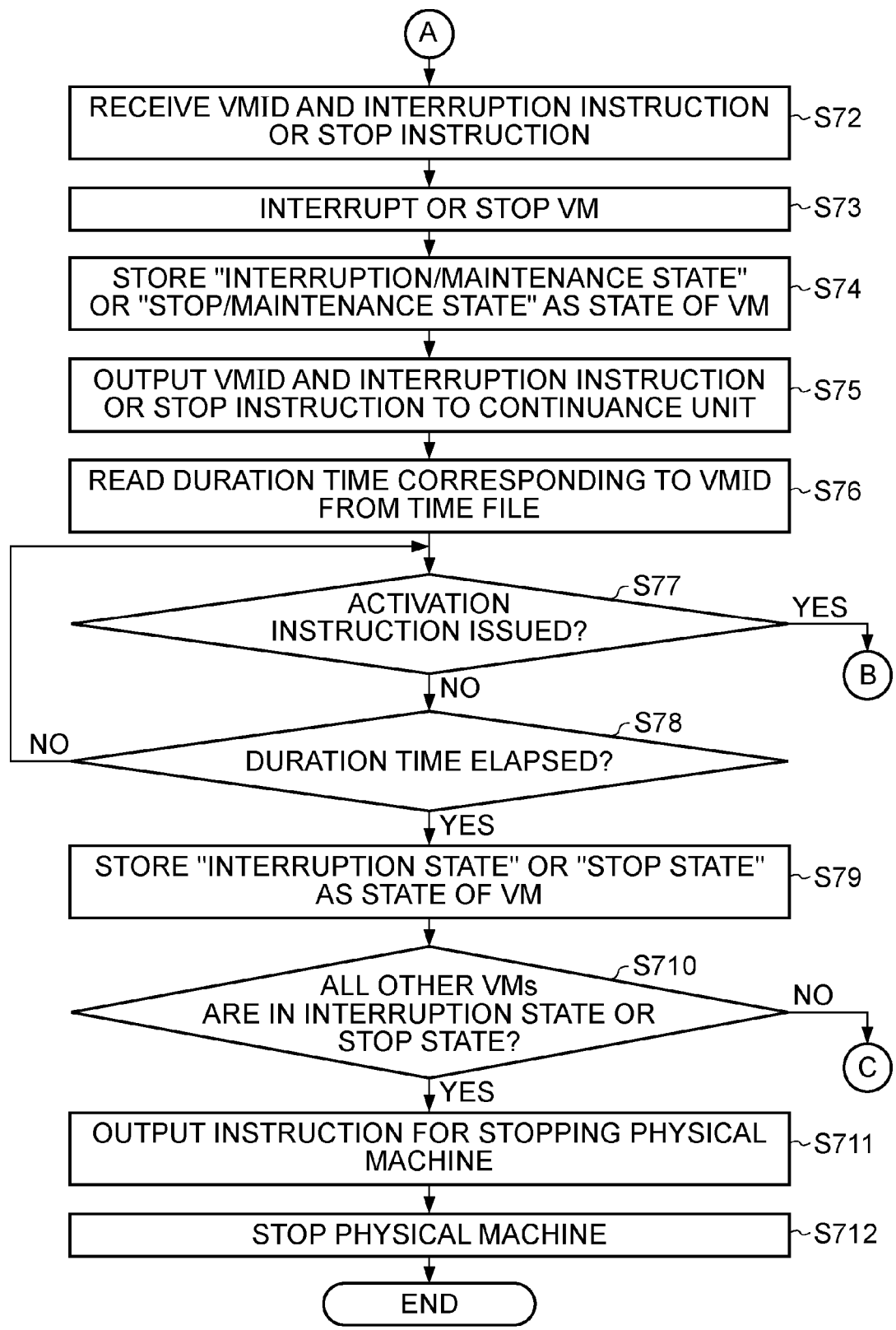
FIG. 7 is a continuation of the flowchart in FIG. 6 illustrating the procedure of the control processing according to a first embodiment.

FIGS. 6 and 7 are flowcharts illustrating a procedure of control processing.

The user who intends to use the physical machine 1 and the VMs 2 activates the physical machine 1 and the VMs 2 using the personal computer 3.

The personal computer 3 outputs a magic packet including an instruction for activating the physical machine 1 to the NIC 16.

The NIC 16 of the physical machine 1 receives the instruction for activating the physical machine 1 (at S61).

The NIC 16 supplies the activation instruction to the power-supply controller 19.

The power-supply controller 19 is turned on and activates the physical machine 1 (at S62).

The CPU 11 loads the VM kernel 17 and the control module 170 into the RAM 12 and performs the following processing.

The personal computer 3 accepts a selection of one of the VMs 2 to be activated.

The personal computer 3 outputs the activation instruction and the VMID of the selected VM 2 to the physical machine 1.

The activation unit 177 receives the instruction for activating the VM 2 and the VMID of the VM 2 supplied through the NIC 16 (at S63).

The activation unit 177 activates the VM 2 corresponding to the VMID (at S64).

The VM kernel 17 stores an "operating state", an "interruption state" or a "stop state" of the VM 2 (at S65).

Since the VM 2 has been activated at S65, the "operating state" which is associated with the VMID is stored.

In a case where the personal computer 3 outputs instructions for activating the other VMs 2, substantially the same processing from S63 to S65 is performed.

Furthermore, processes described below are performed in parallel by the VMs 2.

The generation unit 178 reads a transition period and a state corresponding to the VMID from the setting file 151 (at S66).

The generation unit 178 measures a period of time in which the personal computer 3 does not output an instruction for operating the VM 2 to the NIC 16 with reference to an output from the timer unit 18 (at S67).

The generation unit 178 determines whether the personal computer 3 output an operation instruction (at S68).

When the determination is affirmative at S68, the process returns to S67.

When the determination is negative at S68, it is determined whether the measured period of time exceeds the transition period (at S69).

When the determination is negative at S69, the process returns to S68.

On the other hand, when the determination is affirmative at S69, an interruption instruction or a stop instruction is generated (at S610).

The generation unit 178 outputs the VMID and the generated interruption instruction or the generated stop instruction to the reception unit 171 (at S71).

The reception unit 171 receives the VMID and the interruption instruction or the stop instruction (at S72).

Note that when the personal computer 3 outputs the VMID of the VM 2 and the interruption instruction or the stop instruction, the reception unit 171 receives the VMID and the interruption instruction or the stop instruction.

The stopping unit 173 interrupts or stops the operation of the VM 2 corresponding to the VMID (at S73).

The VM kernel 17 stores the state of the VM 2 (at S74).

At S74, an "interruption/maintenance state" or a "stop/maintenance state" is associated with the VMID and stored.

The stopping unit 173 outputs the received VMID and the interruption instruction or the stop instruction to the continuance unit 172 (at S75).

The continuance unit 172 reads the duration time corresponding to the VMID from the time file 152 (at S76).

The cancelling unit 176 determines whether the personal computer 3 output an instruction for activating the VM 2 corresponding to the VMID within the duration time through the NIC 16 (at S77).

When the determination is affirmative at S77, the process returns to S64.

By this, the VM 2 corresponding to the VMID is activated again, and the operation of the physical machine 1 is continued.

When the determination is negative at S77, the continuance unit 172 determines whether the read duration time has elapsed (at S78).

When the determination is negative at S78, the process returns to S77.

When the determination is affirmative at S78, the VM kernel 17 associates the state of the VM 2 with the VMID and stores an "interruption state" or a "stop state" as the state of the VM 2 (at S79).

The determination unit 175 determines whether all the VMs 2 are in an "interruption state" or a "stop state" (at S710).

Specifically, the determination unit 175 makes the determination with reference to the states of the VMs 2 stored in the VM kernel 17.

When the determination is negative at S710, the process returns to S63.

The processing describe above is repeatedly performed, and substantially the same processing is performed on the other VMs 2 in parallel.

On the other hand, when the determination is affirmative at S710, the output unit 174 outputs an instruction for stopping the operation of the physical machine 1 to the VM kernel 17 (at S711).

The CPU 11 stops the operation of the physical machine 1 in response to the stop instruction supplied from the VM kernel 17 (at S712).

Accordingly, even when an interruption instruction or a stop instruction is issued, the "operating state" of the physical machine 1 is maintained within the duration time.

Consequently, even when the user intends to use the VM 2 again while the "operating state" is maintained, the VM 2 is immediately started when compared with a case where both the physical machine 1 and the VM 2 are activated.

On the other hand, when the duration time has been elapsed and the states of the other VMs 2 are in the "interruption state" or the "stop state", it is determined that it is unlikely that the user uses the VM 2 again, and the operation of the physical machine 1 is stopped. Accordingly, reduction of power consumption may be attained while usability is improved.

A second embodiment relates to control processing for changing duration times in accordance with an interruption instruction or a stop instruction.

FIG. 8 illustrates record layout of a time file 152.

The time file 152 stores interruption duration times serving as first duration times and stop duration times serving as second duration times which are associated with VMIDs.

The time file 152 includes a VMID field, an interruption duration time field, and a stop duration time field.

The interruption duration time field stores periods of time in which VMs 2 enter an "interruption/maintenance state" and operation of a physical machine 1 is continued when a reception unit 171 received an interruption instruction, the periods of time being associated with the VMIDs.

Furthermore, the stop duration time field stores information on periods of time in which the VMs 2 enter a "stop/maintenance state" and the operation of the physical machine 1 is continued when the reception unit 171 received a stop instruction, the periods of time being associated with the VMIDs.

The stop duration times corresponding to the VMIDs are shorter than the interruption duration times corresponding to substantially the same VMIDs.

This is because a stop of the operation is different from an interruption of the operation in that it is unlikely that the physical machine 1 is activated again within a short period of time. Accordingly, reduction of power consumption is emphasized.

According to an example of FIG. 8, an interruption duration time of the VM 21 is three minutes, and a stop duration time of the VM 21 is two minutes which is shorter than the interruption duration time.

Note that the values stored in the time file 152 may be changed using the personal computer 3 where appropriate.

Furthermore, the stop duration times or the interruption duration times may be calculated by setting the interruption duration times or the stop duration times in advance and multiplying the set interruption duration times or the set stop duration times by coefficients using the CPU 11.

In a case where an interruption duration time is set and stored, for example, the CPU 11 may calculate a stop duration time by multiplying the interruption duration time by a coefficient smaller than 1.

Figure 9:
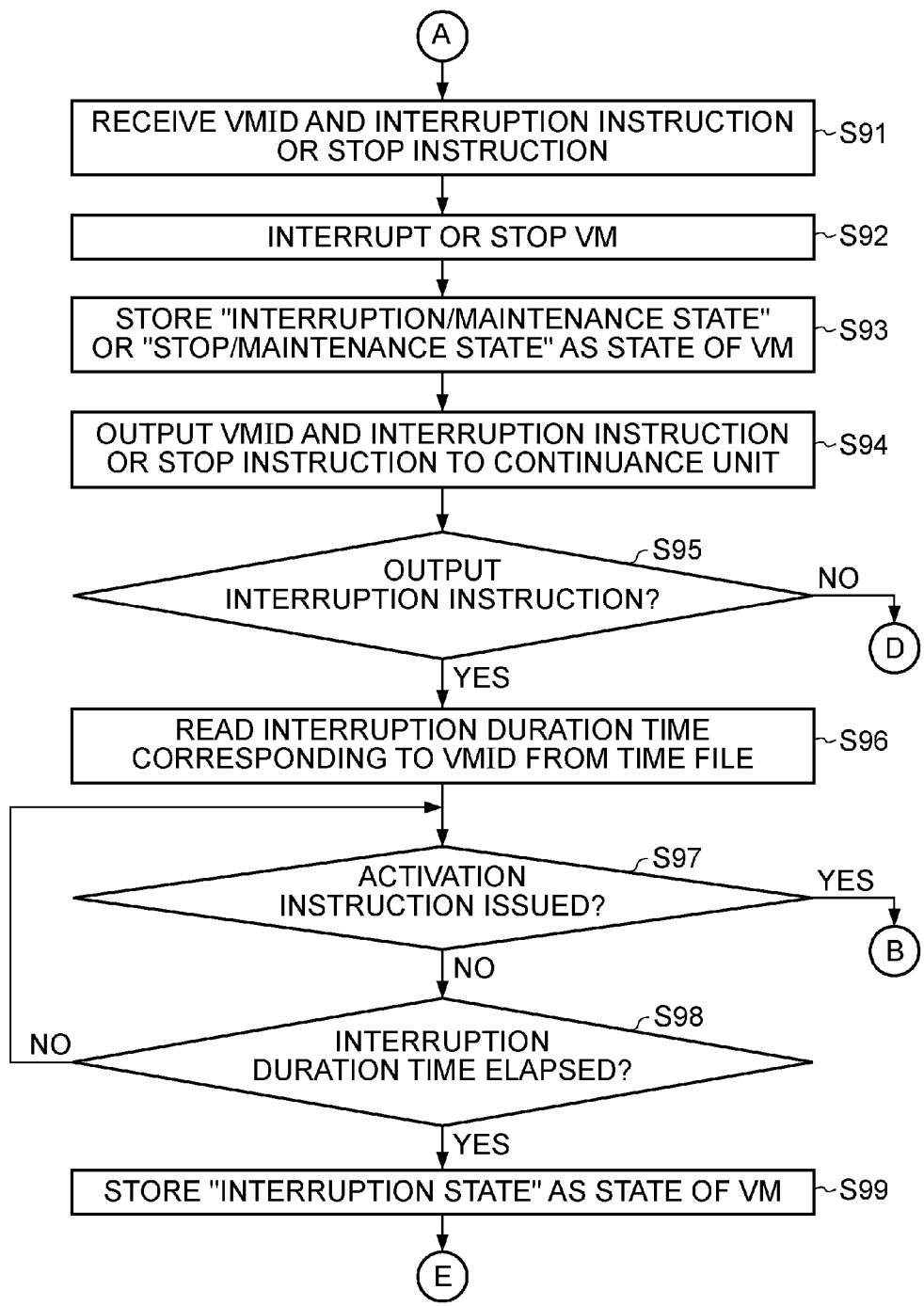
FIG. 9 is a continuation of the flowchart in FIG. 6 illustrating a procedure of interruption processing or stop processing according to a second embodiment.
Figure 10:
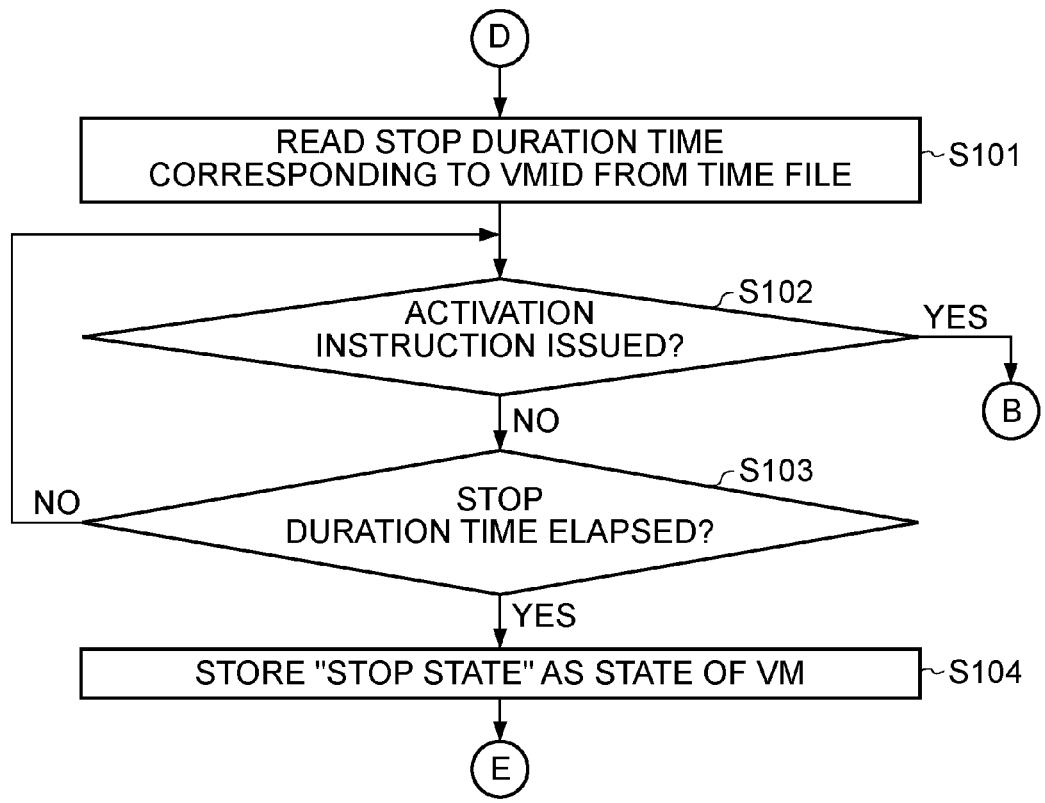
FIG. 10 is a continuation of the flowchart in FIG. 6 illustrating the procedure of the interruption processing or the stop processing according to the second embodiment.
Figure 11:
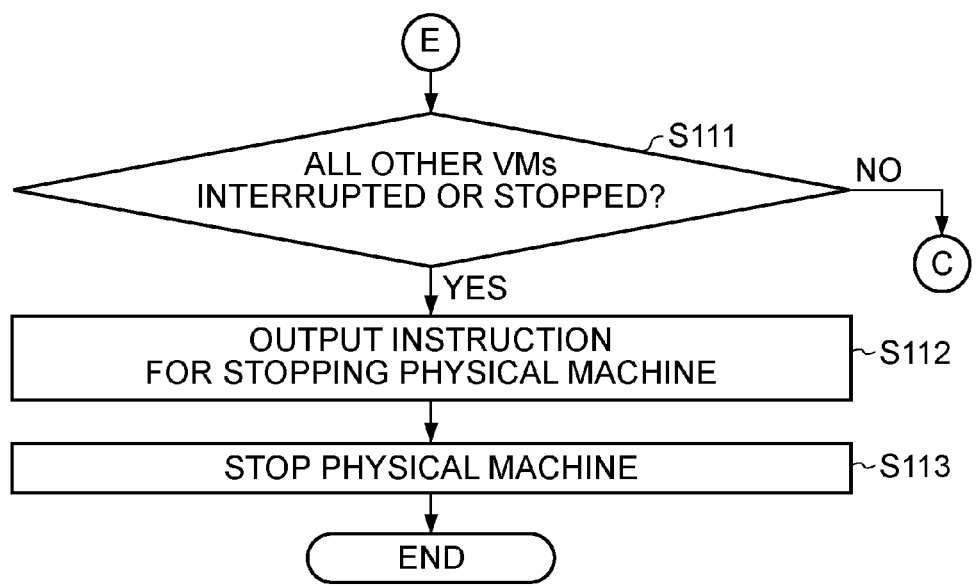
FIG. 11 is a continuation of the flowchart in FIG. 6 illustrating the procedure of the interruption processing or the stop processing according to the second embodiment.

FIGS. 9 and 10 are flowcharts illustrating a procedure of interruption processing or stop processing according to the second embodiment.

After the process at S71 is performed, the following processing is performed.

The reception unit 171 receives a VMID and an interruption instruction or a stop instruction (at S91).

The instruction for interrupting or stopping operation of a VM 2 corresponding to the VMID is supplied to a stopping unit 173, and the stopping unit 173 interrupts or stops the operation of the VM 2 corresponding to the VMID (at S92).

A VM kernel 17 stores an "interruption/maintenance state" or a "stop/maintenance state" as a state of the VM 2 (at S93), the state of the VM 2 being associated with the corresponding VMID.

The reception unit 171 outputs the received VMID and the interruption instruction or the stop instruction to a continuance unit 172 (at S94).

The continuance unit 172 determines whether an interruption instruction has been supplied (at S95).

When the determination is affirmative at S95, the continuance unit 172 reads an interruption duration time corresponding to the VMID from the time file 152 (at S96).

A cancelling unit 176 determines whether the personal computer 3 output an instruction for activating the VM 2 corresponding to the VMID through the NIC 16 within the interruption duration time (at S97).

When the determination is affirmative at S97, the process returns to S64.

By this, the VM 2 is activated again and the operation of the physical machine 1 is continued.

When the determination is negative at S97, the continuance unit 172 determines whether the read interruption duration time has been elapsed (at S98).

When the determination is negative at S98, the process returns to S97.

When the determination is affirmative at S98, the VM kernel 17 stores an "interruption state" as a state of the VM 2 (at S99), the state of the VM 2 being associated with the VMID.

Note that after the process of S99 is performed, the process proceeds to S111, which will be described hereinafter.

When the determination is negative at S95, the continuance unit 172 reads a stop duration time corresponding to the VMID from the time file 152 (at S101).

The cancelling unit 176 determines whether the personal computer 3 output an instruction for activating the VM 2 corresponding to the VMID through the NIC 16 within the stop duration time (at S102).

When the determination is affirmative at S102, the process returns to S64.

By this, the VM 2 start operating again and the operation of the physical machine 1 is continued.

When the determination is negative at S102, the continuance unit 172 determines whether the read stop duration time has been elapsed (at S103).

When the determination is negative at S103, the process returns to S102.

When the determination is affirmative at S103, the continuance unit 172 stores a "stop state" as the state of the VM 2 (at S104), the state of the VM 2 being associated with the VMID.

Note that after the process of S104 is terminated, the process proceeds to S111, which will be described hereinafter.

A determination unit 175 determines whether all the other VMs 2 are in an "interruption state" or a "stop state" (at S111).

When the determination is negative at S111, the process returns to S63.

The processing described above is repeatedly performed, and substantially the same processing is performed on the other VMs 2 in parallel.

On the other hand, when the determination is affirmative at S111, an output unit 174 outputs an instruction for stopping the operation of the physical machine 1 to the VM kernel 17 (at S112).

A CPU 11 receives the stop instruction issued by the VM kernel 17 and stops the operation of the physical machine 1 (at S113).

By this, the control processing associated with continuance driving is optimized depending on a case where an instruction for interrupting the operation of the VM 2 is issued or a case where an instruction for stopping the operation of the VM 2 is issued. Accordingly, usability is improved and reduction of power consumption is achieved.

The second embodiment is configured as described above. Since other configurations of the second embodiment are substantially the same as those of the first embodiment, like components are denoted by like reference numerals, and detailed descriptions thereof are omitted.

In a third embodiment, a time file 152 is optimized.

Figure 12:
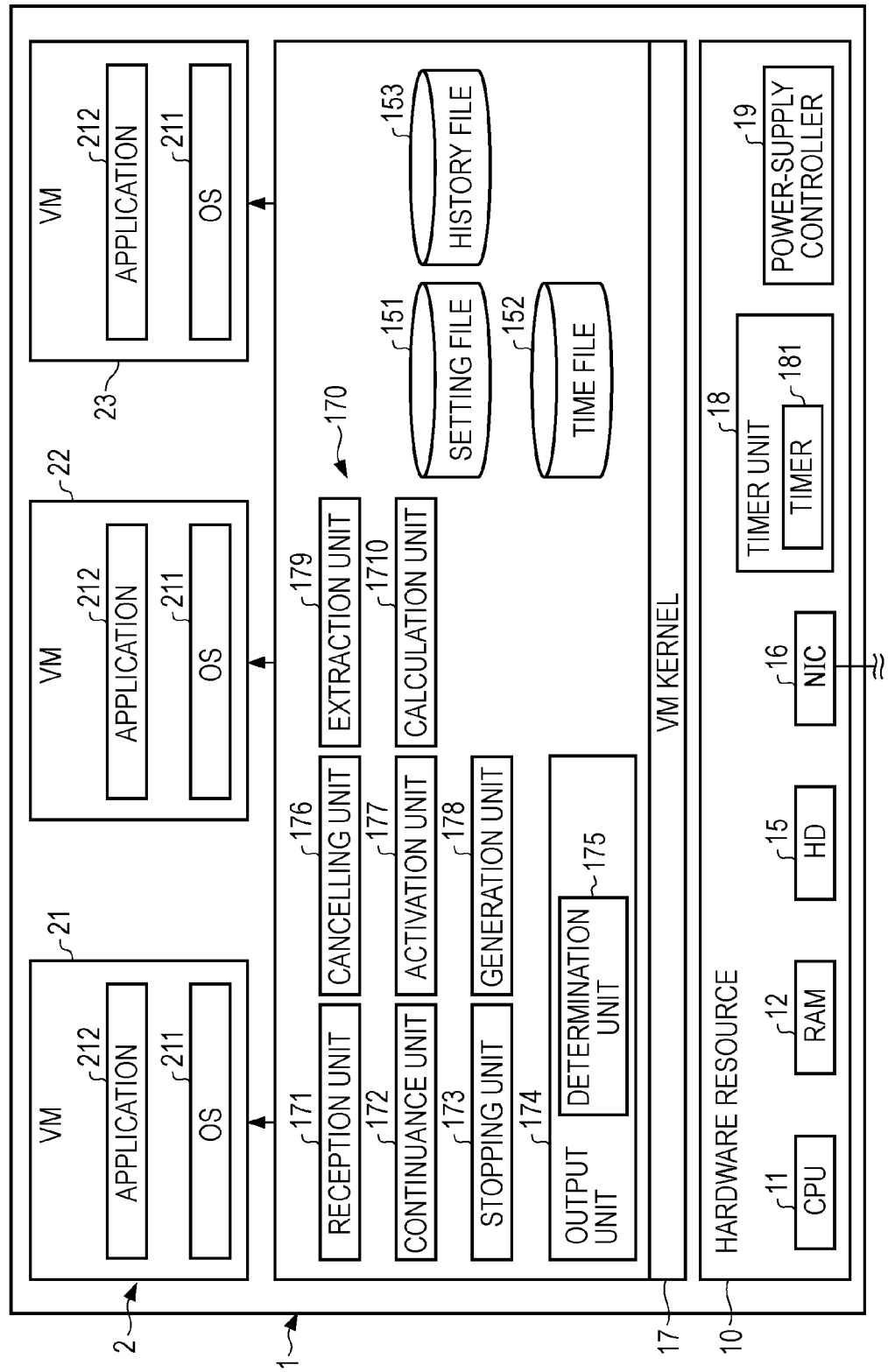
FIG. 12 illustrates hardware and software of a physical machine and VMs according to a third embodiment.

FIG. 12 illustrates hardware and software of a physical machine 1 and VMs 2 according to the third embodiment.

In addition to the configuration of the first embodiment, a history file 153, an extraction unit 179 which records information on changes of states of the VMs 2 in the history file 153, and a calculation unit 1710 which optimizes interruption periods and stop periods recorded in a time file 152 using the history file 153 are provided.

FIG. 13 illustrates record layout of the history file 153.

The history file 153 included in a storage unit such as a RAM 12 or an HD 15 stores operation periods, interruption periods, and stop periods of the VMs 2 and histories of states of the VMs 2 for individual days.

The history file 153 includes a VMID field, a time field, and a state field.

In the VMID field, VMIDs are stored.

In the time field, the operating periods, the interruption periods, and the stop periods which are associated with the VMIDs are stored.

Furthermore, in the state field, states of the VMs 2 at time points when the states of the VMs 2 are stored after being associated with the VMIDs are stored.

An example shown in FIG. 13 shows histories of the operating periods, the interruption periods, and the stop periods of the VMs 21 to 23 and the states of the VMs 21 to 23.

For example, it is apparent that the VM 21 is in an "operating state" from 9:00 to 11:00, in an "interruption state" from 11:00 to 11:10, and in an "operating state" from 11:10 to 11:30.

Note that description of years and seconds is omitted for simplicity of description.

Furthermore, a timer unit 18 outputs information on a day of a week and information representing a weekday or a public holiday to a VM kernel 17. The VM kernel 17 stores the information on a day of a week and the information representing a weekday or a public holiday in recording fields in the history file 153.

As described at S64, S73, S92, S98, and S103, when an activation unit 177 activates a VM 2, or when a stopping unit 173 interrupts or stops operation of the VM 2, the VM kernel 17 stores an operating period, an interruption period, and a stop period in the history file 153 along with a state of the VM 2.

Specifically, the VM kernel 17 refers to an output from the timer unit 18 and stores an "operating state", an "interruption state", or a "stop state" corresponding to the operating period, the interruption period, or the stop period, the states being associated with the VMIDs.

In this way, histories of the VMs 2 are stored taking duration times into consideration.

The extraction unit 179 extracts interruption periods or stop periods which are shorter than a predetermined threshold value from among interruption periods and stop periods of the VMs 2 from the history file 153.

Note that although the threshold value corresponds to 10 minutes in this embodiment, this is merely an example and the present invention is not limited to this.

Furthermore, although both interruption periods and stop periods are extracted and both interruption duration times and stop duration times in the time file 152 are optimized, for example, in this embodiment, the present invention is not limited to this.

The interruption duration times or the stop duration times may be extracted and the interruption duration times or the stop duration times in the time file 152 may be optimized.

The extraction unit 179 extracts interruption periods and stop periods of the VMs 2 for a predetermined number of days with reference to the time field and the state field of the history file 153.

In this embodiment, a case where interruption periods and stop periods for past 10 weeks are extracted for individual weekdays will be described as an example.

For example, interruption periods and stop periods of Mondays in past 10 weeks except for holiday-Mondays which are shorter than 10 minutes are extracted.

Note that this extraction example is merely an example, and the present invention is not limited to this.

The calculation unit 1710 obtains an optimized interruption period and an optimized stop period using the interruption periods and the stop periods extracted by the extraction unit 179.

For example, the calculation unit 1710 calculates an average value of the extracted interruption periods as the optimized interruption period and an average value of the extracted stop periods as the optimized stop period.

Alternatively, the calculation unit 1710 may determine the longest interruption period or the shortest interruption period among the extracted interruption periods as the optimized interruption period.

Similarly, the calculation unit 1710 may determine the longest stop period or the shortest stop period among the extracted stop periods as the optimized stop period.

Furthermore, the calculation unit 1710 may categorize the extracted interruption periods in accordance with time periods such as a time period which is equal to or larger than one minute and smaller than two minutes, a time period which is equal to or larger than two minutes and smaller than three minutes, and a time period which is substantially equal to or larger than three minutes and smaller than four minutes and normalize the interruption periods, and determine a time period which corresponds to a largest number of interruption periods as the optimized interruption period.

Similarly, the calculation unit 1710 may categorize the extracted stop periods in accordance with time periods such as a time period which is substantially equal to or larger than one minute and smaller than two minutes, a time period which is substantially equal to or larger than two minutes and smaller than three minutes, and a time period which is substantially equal to or larger than three minutes and smaller than four minutes and normalize the interruption periods, and determine a time period which corresponds to a largest number of interruption periods as the optimized stop period.

In this embodiment, an example of an optimization performed by calculating an average interruption period and an average stop period will be described as an example.

FIG. 14 illustrates record layout of the time file 152 according to the third embodiment.

The time file 152 stores average interruption duration times and average stop duration times corresponding to VMIDs for individual days of a week.

Furthermore, as shown in FIG. 14, weekdays and public holidays are distinguished from each other even if days of a week are the same as each other, when the average interruption duration times and the average stop duration times corresponding to the VMIDs are stored.

FIG. 14 illustrates an example of data of weekday-Monday.

The calculation unit 1710 stores an obtained average interruption period as an average interruption duration time in the time file 152.

Furthermore, the calculation unit 1710 stores an obtained average stop period as an average stop duration time in the time file 152.

Note that extraction processing performed by the extraction unit 179 and calculation processing performed by the calculation unit 1710 may be executed in a predetermined time zone.

Figure 15:
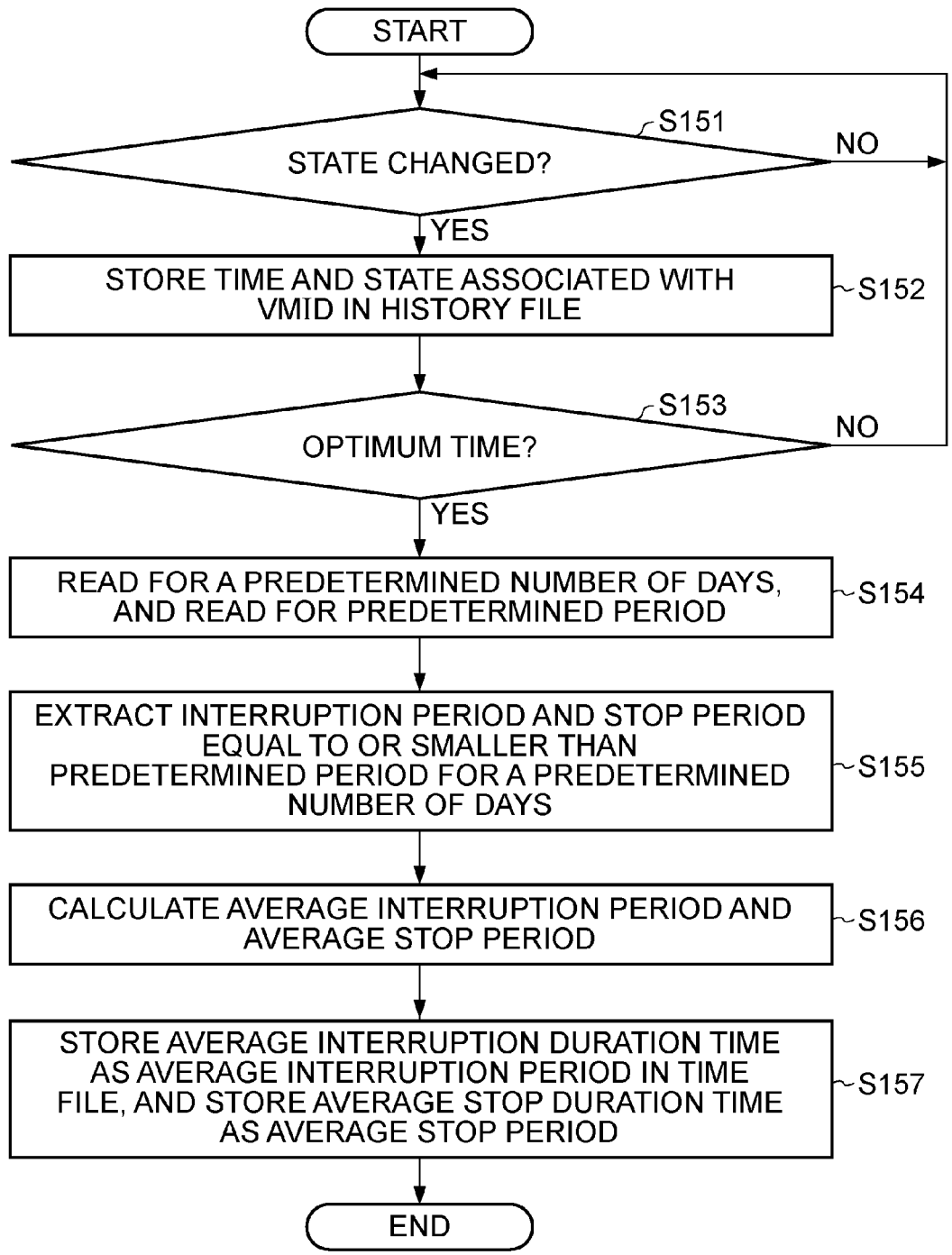
FIG. 15 is a flowchart illustrating a procedure of optimizing processing.

FIG. 15 is a flowchart illustrating a procedure of optimizing processing.

The VM kernel 17 determines whether a state of a VM 2 is changed with reference to outputs from the activation unit 177 and the stopping unit 173 (at S151).

When the determination is negative at S151, the VM kernel 17 waits until the state of the VM 2 is changed.

On the other hand, when the determination is affirmative at S151, a time and a state corresponding to the VMID are stored in the history file 153 as shown in FIG. 13 (at S152).

Note that, although a history is stored and a duration time is optimized for each VM 2 in this embodiment, when a plurality of users having respective user IDs use a VM 2, histories may be stored for individual users and duration times may be optimized for individual users.

The extraction unit 179 reads time information which is stored in the HD 15 and which corresponds to a time when optimization is to be performed.

For example, the time information represents "3:00 p.m. every day", for example.

The extraction unit 179 determines whether the time when optimization is to be performed has been reached (at S153).

When the determination is negative at S153, the process returns to S151 and a history is stored again.

On the other hand, when the determination is affirmative at S153, information on the predetermined number of days and information on a predetermined period of time (threshold value) stored in the HD 15 in advance are read (at S154).

The extraction unit 179 extracts interruption periods and stop periods which are equal to or smaller than the read predetermined period of time for the predetermined number of days (at S155).

The timer unit 18 outputs information on a day of a week and information used to identify a weekday or a public holiday.

The extraction unit 179 extracts, among the interruption periods and the stop periods for the number of past days (for example, 10 days) which correspond to a day of a week of a current day and which corresponds to a public holiday or a weekday selected so as to correspond to the current day, interruption periods and stop periods which are substantially equal to or smaller than a predetermined period of time (10 minutes, for example).

The calculation unit 1710 divides a sum of the interruption periods by the number of read interruption periods and divides a sum of the stop periods by the number of read stop periods. In this way, an average interruption period and an average stop period are obtained (at S156).

The calculation unit 1710 determines the average interruption period as an average interruption duration time and the average stop period as an average stop duration time which are to be stored in the time file 152 (at S157).

Here, in the time file 152, information representing a property such as a day of a week, a weekday or a public holiday, and the average interruption duration time and the average stop duration time corresponding to the VMID.

The processing described above is executed for each VM 2.

Then, when an interruption duration time is read at S96, a continuance unit 172 reads one of the interruption duration times from the time file 152 with reference to the information representing a day of a week and a public holiday or a weekday supplied from the timer unit 18.

Similarly, when a stop duration time is read at S101, the continuance unit 172 reads one of the stop duration times from the time file 152 with reference to the information representing a day of a week and a public holiday or a weekday supplied from the timer unit 18.

By this, the duration times of the VMs 2 may be optimized in accordance with use of the VMs 2. Accordingly, usability is improved and reduction of power consumption is enhanced.

The third embodiment is characterized as described above, and other configurations of the third embodiment are substantially the same as those of the first and second embodiments. Therefore, like components are denoted by like reference numerals, and descriptions thereof are omitted.

A fourth embodiment relates to a configuration in which interruption processing or stop processing is performed as scheduled.

Figure 16:
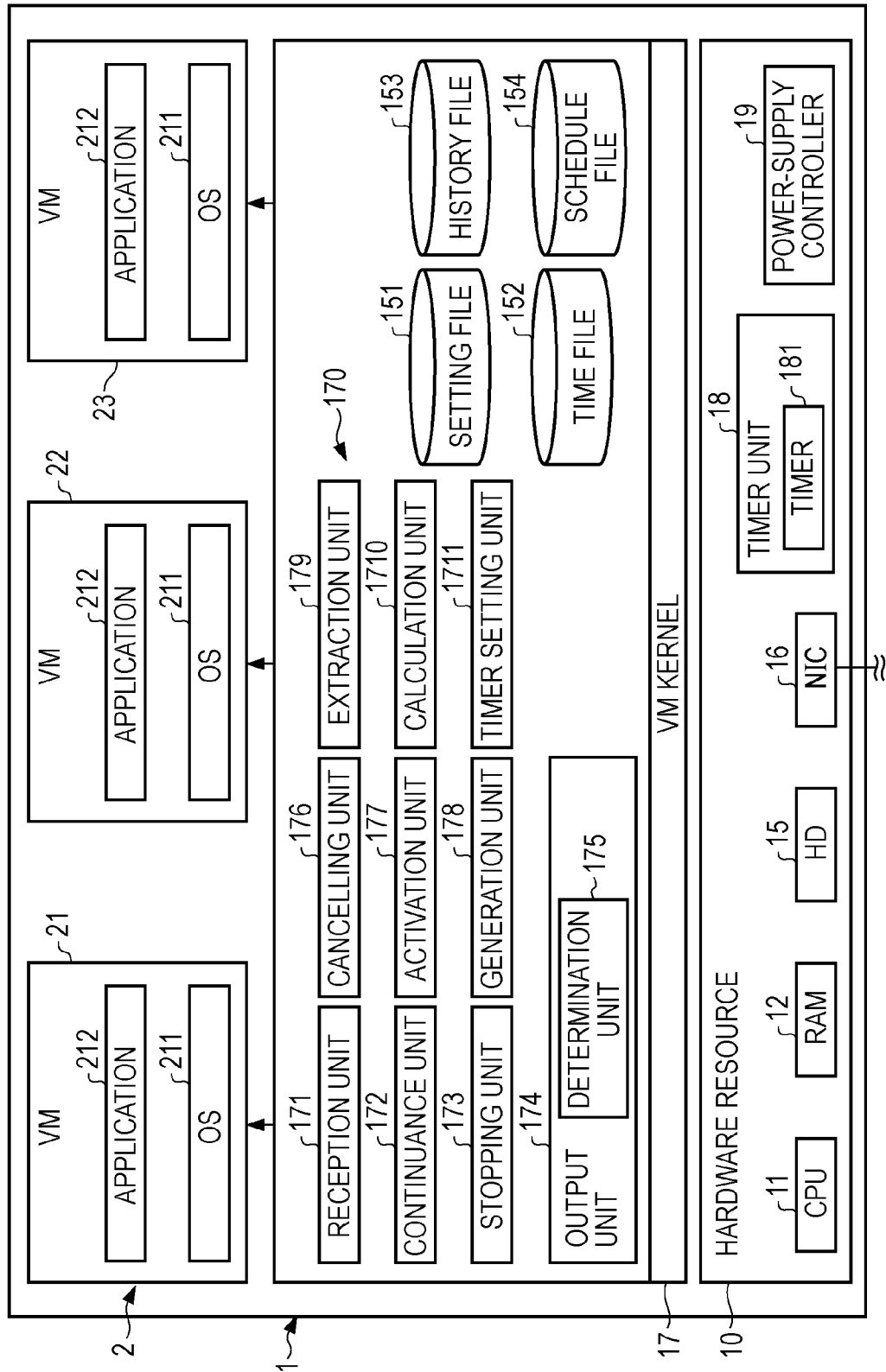
FIG. 16 illustrates hardware and software of a physical machine and VMs according to a fourth embodiment.

FIG. 16 is a block diagram illustrating hardware and software of a physical machine 1 and VMs 2 according to the fourth embodiment.

In the fourth embodiment, a timer setting unit 1711 and a schedule file (stop-storing unit) 154 are additionally provided.

Figure 17:
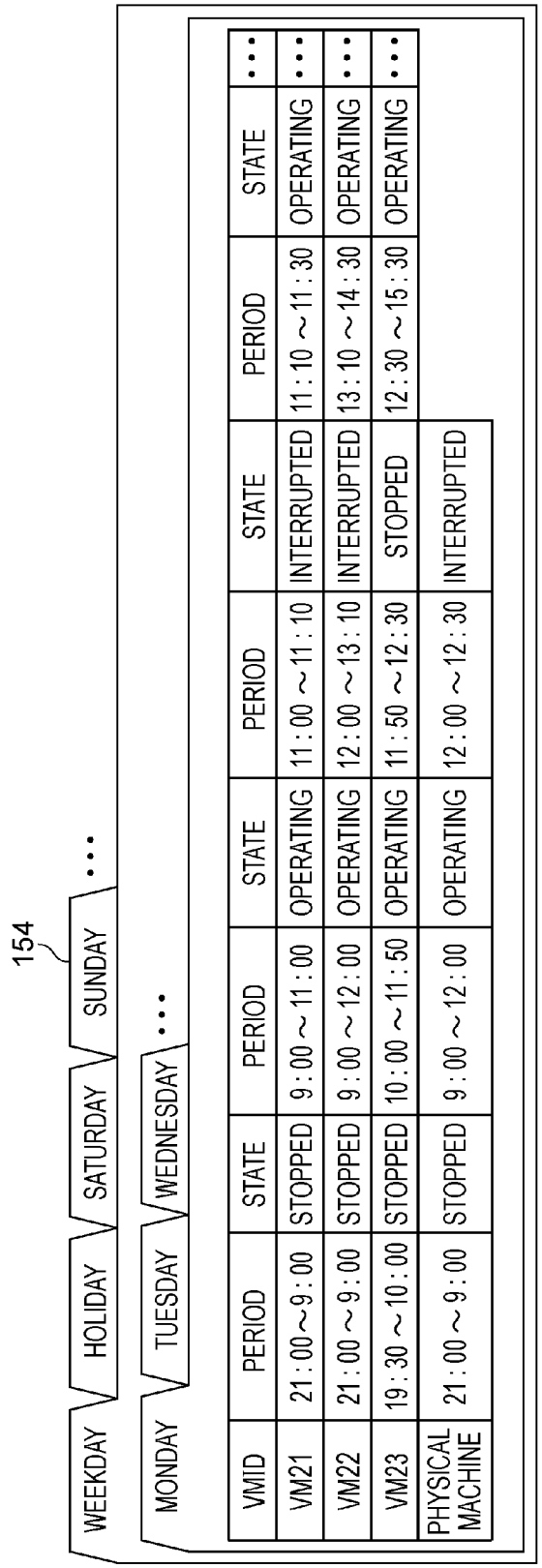
FIG. 17 illustrates record layout of a schedule file.

FIG. 17 illustrates record layout of the schedule file 154.

The schedule file 154 included in a RAM 12 or an HD 15 stores schedule of operating periods, interruption periods, and stop periods of the VMs 2 and the physical machine 1 for individual weekday-Monday to weekday-Friday, a public holiday, Saturday, and Sunday.

Data in the schedule file 154 may be appropriately modified using a personal computer 3.

In an example shown in FIG. 17, the stop periods and the operating periods of the physical machine 1 and the stop periods and the operating periods of the VMs 2 on weekday-Monday are stored.

Note that schedule shown in FIG. 17 is merely an example. The same schedule may be set for every day irrespective of days of a week, and alternatively, two types of schedule, that is, schedule of weekdays and schedule of weekends and public holidays may be set.

In the example shown in FIG. 17, according to the stored schedule, the physical machine 1 is in a "stop state" from 21:00 to 9:00.

According to the stored schedule, while the physical machine 1 is in the stop state, the VMs 2 are also in stop states.

When operation of the physical machine 1 is to be stopped, the timer setting unit 1711 sets a timer 181 so that the physical machine 1 is activated by an end of a stop period (by 9:00 in the example of FIG. 7) with reference to the schedule file 154.

The timer unit 18 and the timer 181 operate even when the physical machine 1 is in the stop state. When determining that the end of the stop period has been reached, the timer 181 transmits an activation instruction to a CPU 11.

Note that, although a case where the physical machine 1 is activated after the end of the stop period has been reached is described in this embodiment for simplicity of description, the present invention is not limited to this.

For example, the physical machine 1 may be activated in advance before the end of the stop period is reached.

In this case, a time point when the physical machine 1 is activated may be obtained by performing back calculation from the end of the stop period using a required period of time from when the physical machine 1 is activated to when the VMs 2 are ready to be activated.

In this way, the time point when the physical machine 1 is activated may be determined.

For example, when five minutes is required for activating the physical machine 1, the physical machine 1 is activated five minutes before the stop period is terminated.

By this, when the stop period is terminated, the physical machine 1 enters a usable state.

Note that the period of time required for activating the physical machine 1 may be measured in advance or may be appropriately set using the personal computer 3.

The CPU 11 activates the physical machine 1 by activating a VM kernel 17 and a control module 170.

An activation unit 177 activates certain VMs 2 when the interruption periods or the stop periods of the VMs 2 are terminated with reference to an output from the timer unit 18 and the schedule file 154.

In the example of FIG. 17, the VMs 21 and 22 are activated at 9:00 and the VM 23 is activated at 10:00.

Note that, although a case where the physical machine 1 is activated when the end of the stop period has been reached and thereafter a VM 2 is activated is described as an example in this embodiment for simplicity of description, the present invention is not limited to this.

For example, the VM 2 may be activated in advance before the end of the stop period.

In this case, a time point when the VM 2 is activated may be obtained by performing back calculation from the end of the stop period using a required period of time from when the physical machine 1 is activated to when activation of the VM 2 is completed.

In this way, the activation time of the physical machine 1 and the activation time of the VM 2 may be determined.

For example, in a case where five minutes is required for the activation of the physical machine 1 and three minutes is required for the activation of the VM 2, the physical machine 1 is activated eight minutes before the end of the stop period.

Thereafter, the VM 2 is activated three minutes before the end of the stop period.

By this, the VM 2 is ready to be used when the stop period is terminated.

Note that the period of time required for the activation of the VM 2 may be measured in advance or may be appropriately set using the personal computer 3.

Figure 18:
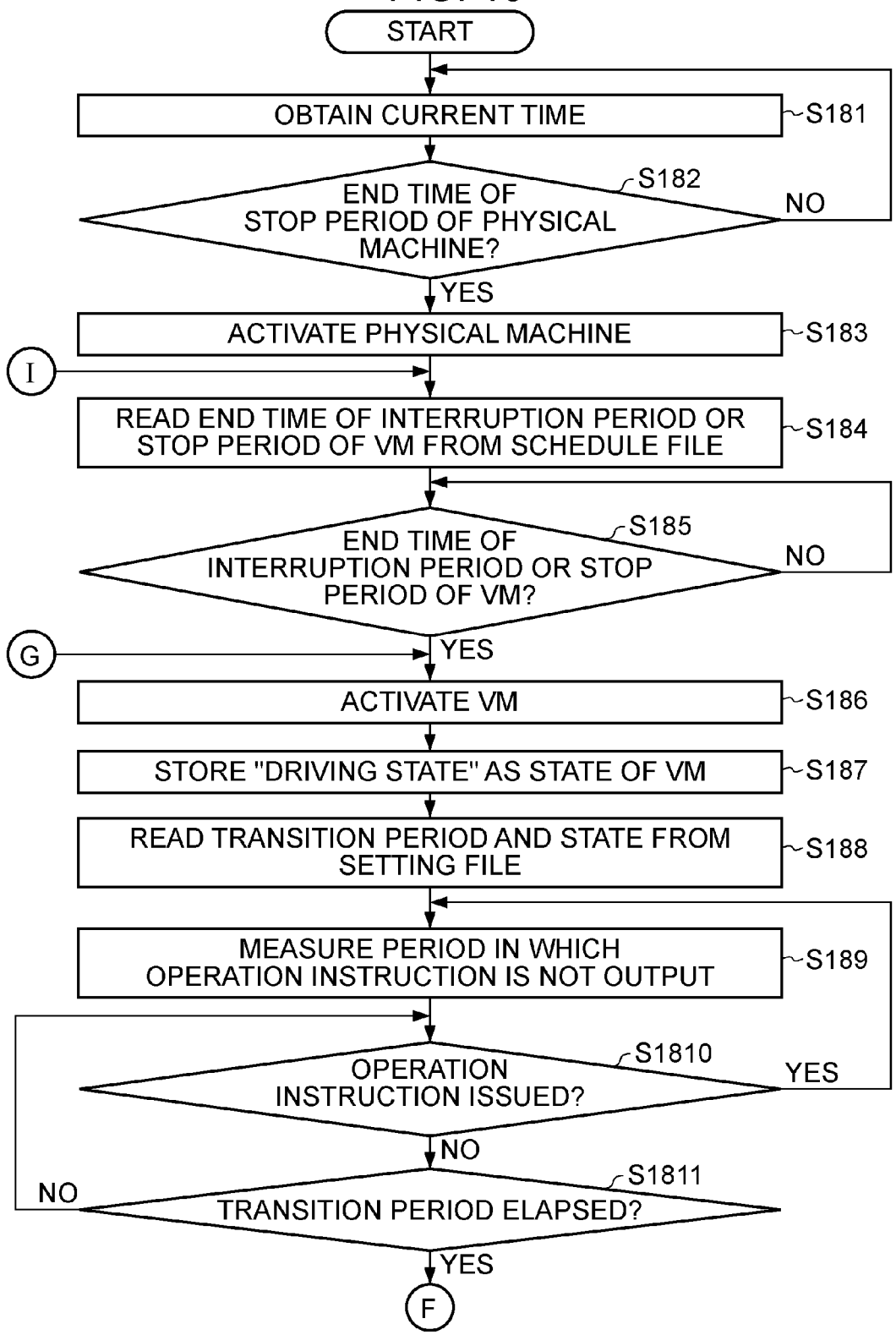
FIG. 18 is a flowchart illustrating a procedure of control processing.
Figure 19:
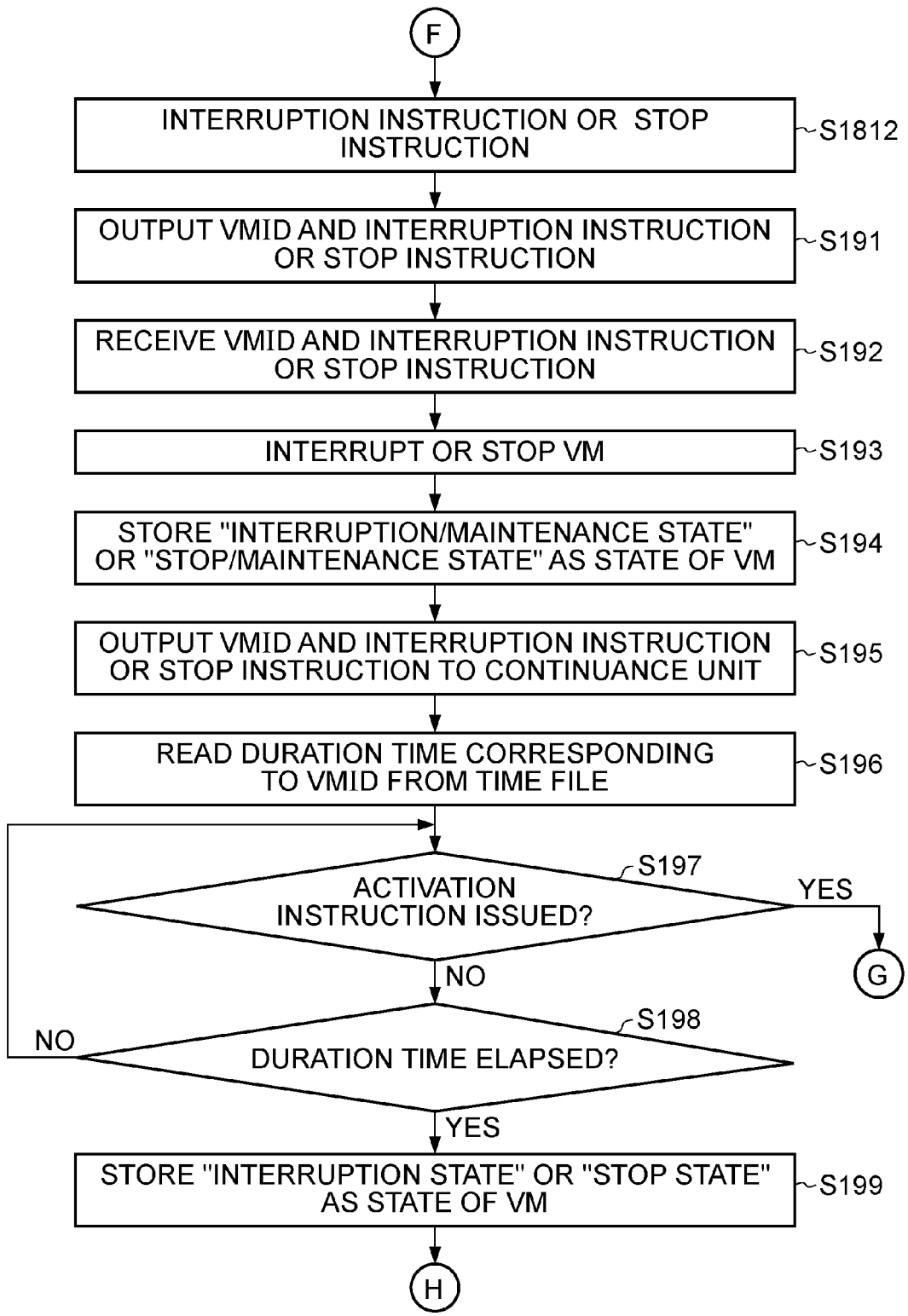
FIG. 19 is a continuation of the flowchart in FIG. 18 illustrating the procedure of the control processing.
Figure 20:
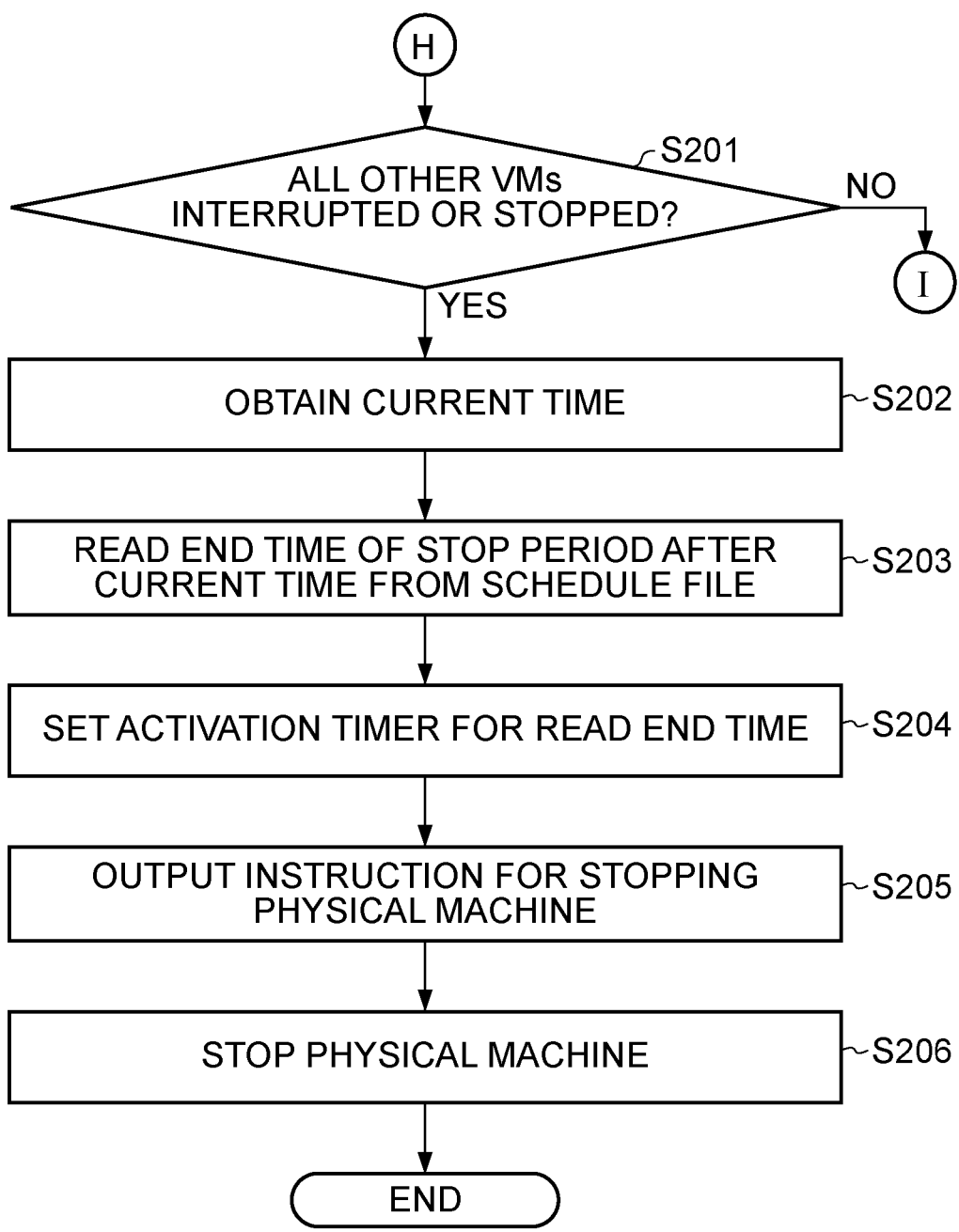
FIG. 20 is a continuation of the flowchart in FIG. 18 illustrating the procedure of the control processing.

FIGS. 18 to 20 are flowcharts illustrating a procedure of control processing.

While the operation of the physical machine 1 is stopped, the timer 181 obtains a current time output from the timer unit 18 (at S181).

The timer 181 determines whether the current time has reached an end of a stop period of the physical machine 1 which was set when the physical machine 1 was previously stopped (at S182).

When the determination is negative at S182, the process returns to S181.

On the other hand, when the determination is affirmative at S182, the physical machine 1 is activated (at S183).

Specifically, the timer 181 outputs an on-signal to a power-supply controller 19.

The power-supply controller 19 supplies electric power to the physical machine 1.

Processes at S184 to S201, which will be described hereinafter, are performed by the VMs 21 to 23 in parallel.

The activation unit 177 reads an end of the interruption period or the stop period of the VM 2 from the schedule file 154 (at S184). The activation unit 177 determines whether a current time output from the timer unit 18 has reached the end of the interruption period or the stop period of the VM 2 (at S185).

When the determination is negative at S185, the activation unit 177 waits until the interruption period or the stop period of the VM 2 has been reached.

On the other hand, when the determination is affirmative at S185, the VM 2 of interest is activated (at S186).

The VM kernel 17 associates a state of the VM 2 with a VMID and stores an "operating state" as the state of the VM 2 (at S187).

Note that the timer unit 18 outputs, in addition to information on a time, information representing a day of a week and information representing whether the day is a public holiday to the activation unit 177.

The activation unit 177 refers to the information representing a day of a week and the information representing whether the day is a public holiday, and reads an interruption period and a stop period of the VM 2 of interest from the schedule file 154 shown in FIG. 17.

Note that the activation unit 177 reads an appropriate stop period of the physical machine 1 on the basis of the information on a day of a week when the process is performed and information representing whether the day is a public holiday.

A generation unit 178 reads a transition period and a state from a setting file 151 corresponding to the VMID (at S188).

The generation unit 178 measures a period of time in which an instruction for operating the VM 2 is not received (at S189).

The generation unit 178 determines whether an instruction for operating the VM 2 is supplied from the personal computer 3 (at S1810).

When the determination is affirmative at S1810, the process returns to S189.

When the determination is negative at S1810, the generation unit 178 determines whether the measured period of time exceeds the transition period (at S1811).

When the determination is negative at S1811, the process returns to S1810.

On the other hand, when the determination is affirmative at S1811, the generation unit 178 generates an interruption instruction or a stop instruction (at S1812).

The generation unit 178 outputs the VMID and the generated interruption instruction or the generated stop instruction to the reception unit 171 (at S191).

The reception unit 171 receives the VMID and the interruption instruction or the stop instruction (at S192).

Note that, as described in the first embodiment, even when the VMID of the VM 2 and an interruption instruction or a stop instruction are output from the personal computer 3, the generation unit 178 may generate an interruption instruction or a stop instruction.

A stopping unit 173 interrupts or stops operation of the VM 2 of interest (at S193).

The VM kernel 17 stores a state of the VM 2 (at S194).

At S194, an "interruption/maintenance state" or a "stop/maintenance state" is stored after being associated with the VMID.

The stopping unit 173 outputs the received VMID and the interruption instruction or the stop instruction to a continuance unit 172 (at S195).

The continuance unit 172 reads a duration time corresponding to the VMID from the time file 152 (at S196).

Note that, in this embodiment, a case where duration times stored in the time file 152 are used for individual VMs 2 irrespective of types of instructions, i.e., an interruption instruction and a stop instruction is described as an example, for simplicity of description.

The cancelling unit 176 determines whether an instruction for activating the VM 2 corresponding to the VMID is output from the personal computer 3 through a NIC 16 within the duration time (at S197).

When the determination is affirmative at S197, the process returns to S186.

By this, the operation of the VM 2 is started again, and the operation of the physical machine 1 is continued.

When the determination is negative at S197, the continuance unit 172 determines whether the read duration time has been elapsed (at S198).

When the determination is negative at S198, the process returns to S197.

When the determination is affirmative at S198, the VM kernel 17 associates the state of the VM 2 with the VMID and stores an "interruption state" or a "stop state" as the state of the VM 2 (at S199).

The determination unit 175 determines whether all the other VMs 2 are in an "interruption state" or a "stop state" (at S201).

Specifically, the determination unit 175 makes the determination with reference to the states of the VM 2 stored in the VM kernel 17.

When the determination is negative at S201, the process returns to S184.

The processing described above is repeatedly performed, and substantially the same processing is performed on the other VMs 2 in parallel.

On the other hand, when the determination is affirmative at S201, the determination unit 175 obtains information on a current time from the timer unit 18 (at S202).

The determination unit 175 outputs the information on a current time to the timer setting unit 1711.

The timer setting unit 1711 reads an end of the stop period which comes after the current time from the schedule file 154 (at S203).

For example, in a case where the current time is 11:50, since a stop period from 12:00 to 12:30 comes next, a time point of 12:30 which is the end of the stop period is read.

The timer setting unit 1711 sets an activation timer of the timer 181 so that the physical machine 1 is activated at the end of the stop period which has been read (at S204).

When the activation timer is set as described above, the physical machine 1 is activated through the processes at S181 to S183.

After the timer setting unit 1711 sets the activation timer, an output unit 174 outputs an instruction for stopping the operation of the physical machine 1 to the VM kernel 17 (at S205).

The CPU 11 stops the operation of the physical machine 1 in response to the stop instruction supplied from the VM kernel 17 (at S206).

In this way, with reference to the schedule file 154, the physical machine 1 and the VMs 2 may enter an "operating state" in accordance with use of the physical machine 1 and the VMs 2.

Figure 21:
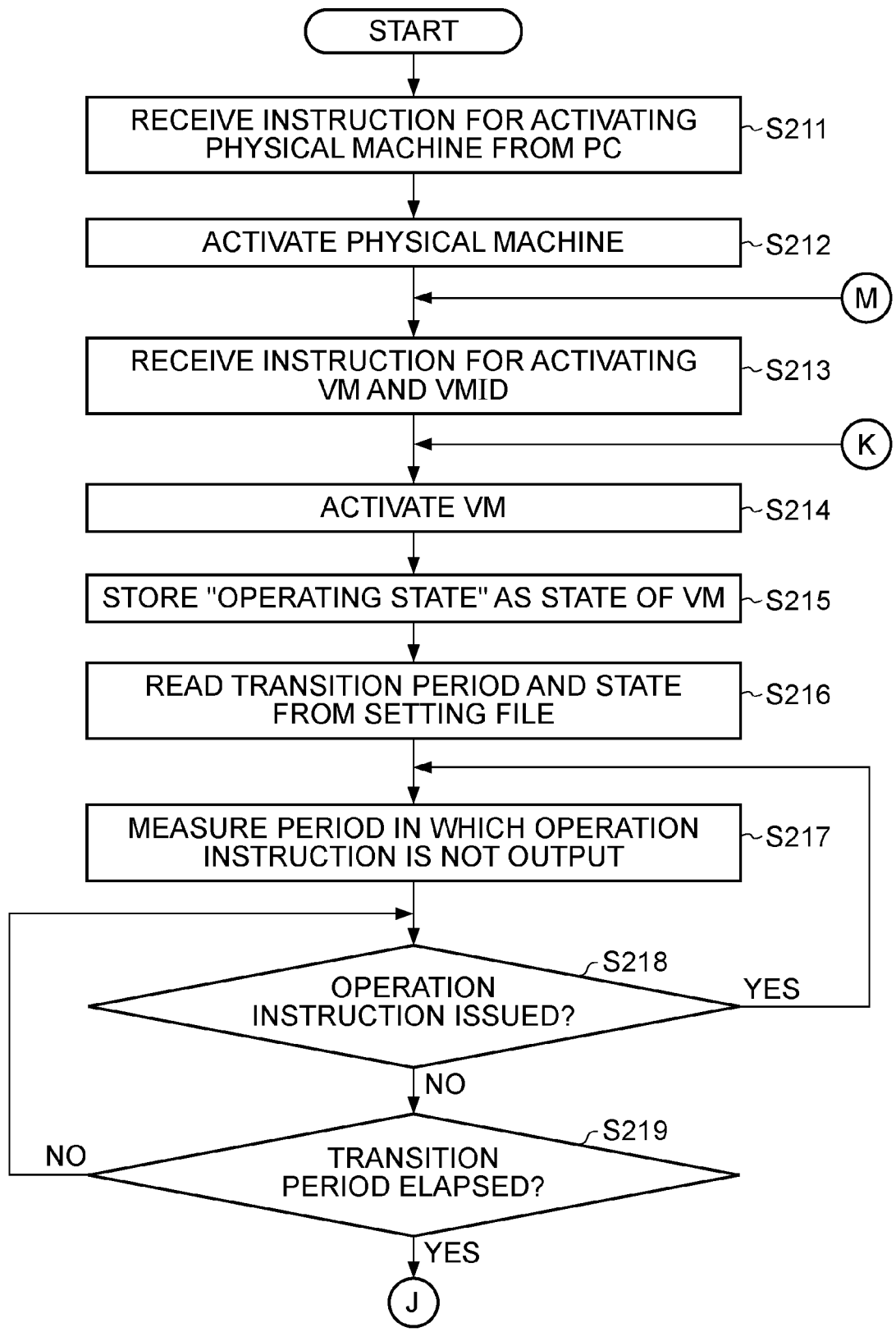
FIG. 21 is a flowchart illustrating another procedure of control processing.
Figure 22:
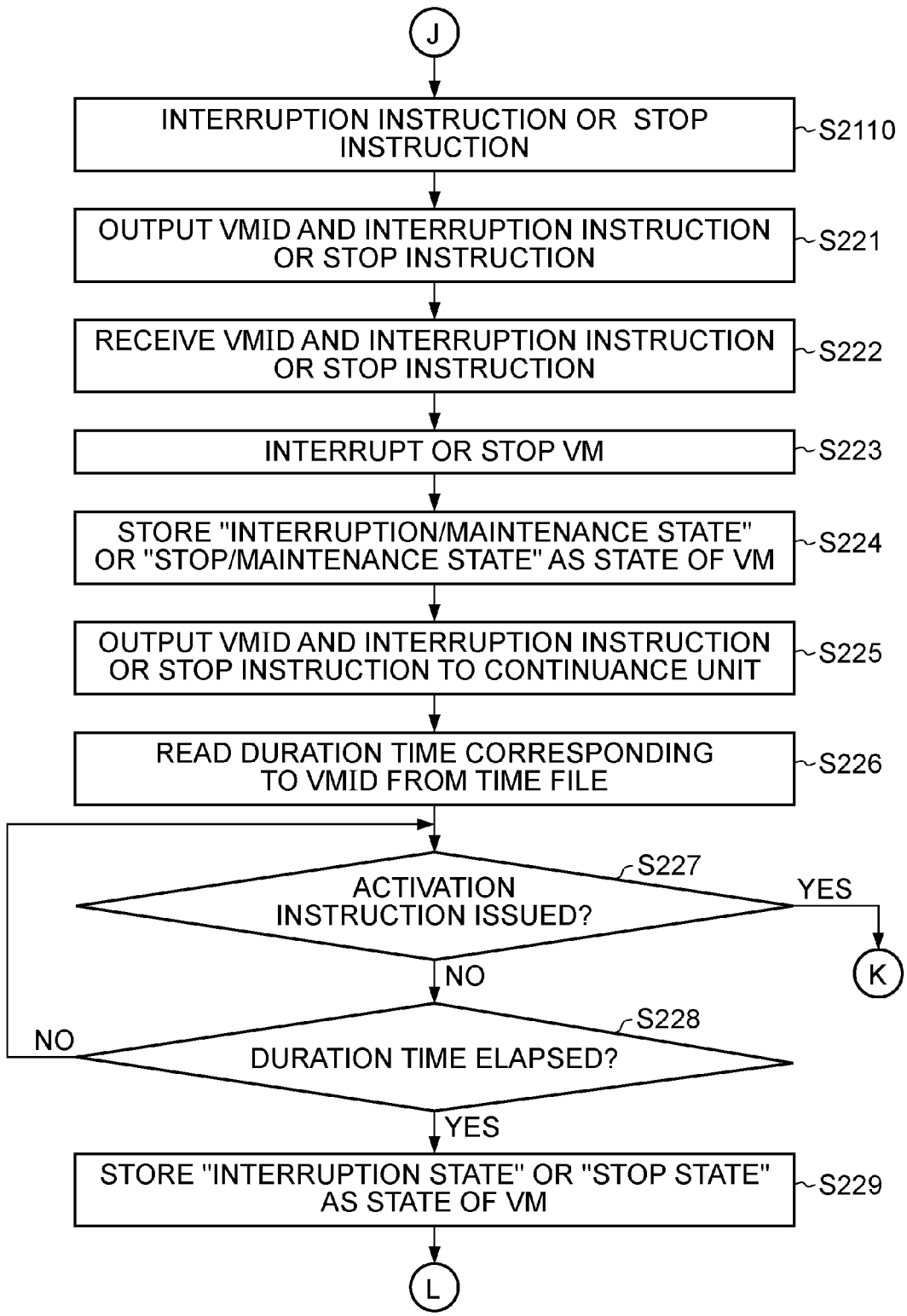
FIG. 22 is a continuation of the flowchart in FIG. 21 illustrating the procedure of the control processing.
Figure 23:
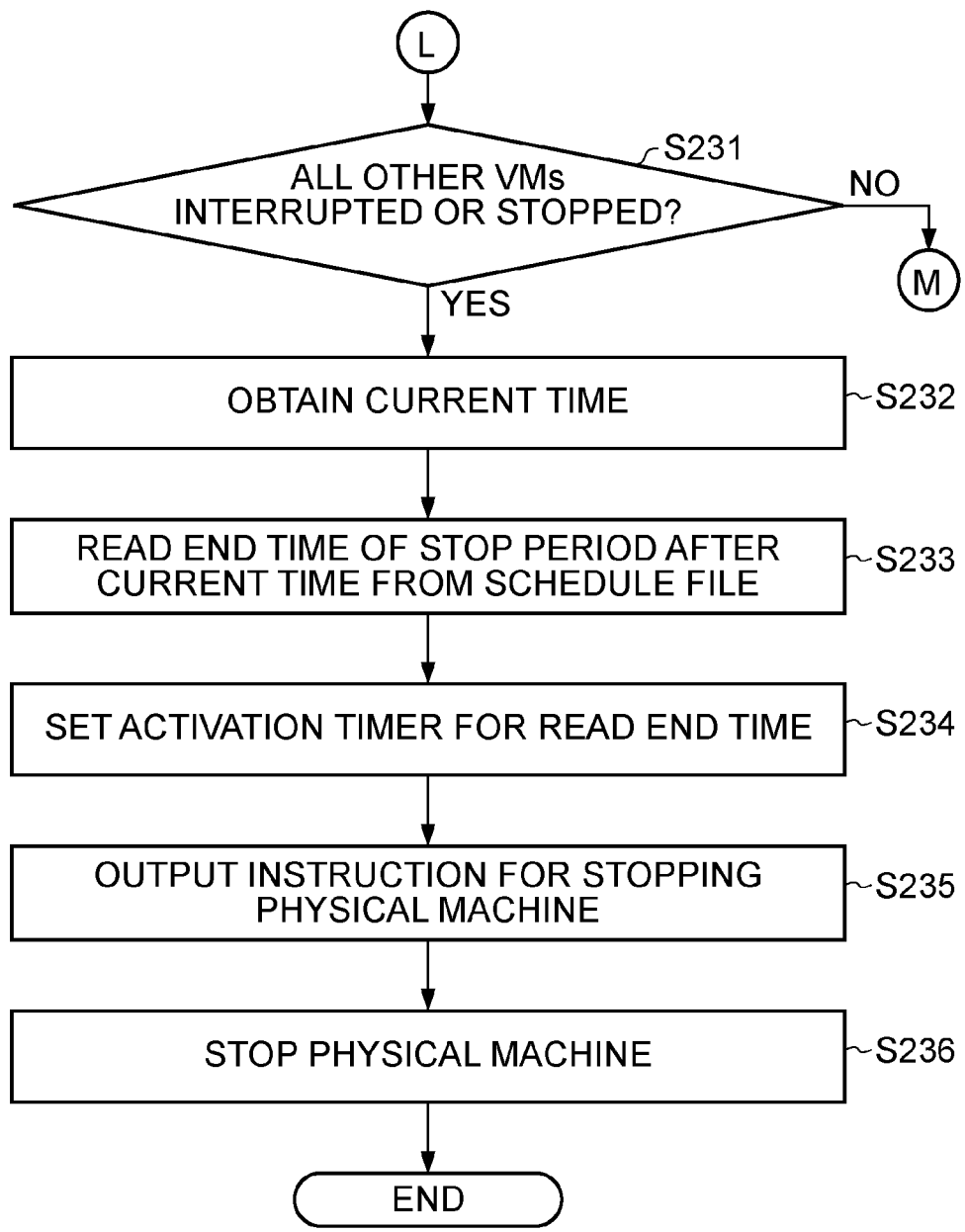
FIG. 23 is a continuation of the flowchart in FIG. 21 illustrating the procedure of the control processing.

FIGS. 21 to 23 are flowcharts illustrating another procedure of control processing.

It is assumed that, although the physical machine 1 is scheduled as a "stop" state at 5:00 a.m. in the schedule file 154 shown in FIG. 17, a user activates the physical machine 1 and the VMs 2 through the personal computer 3.

The NIC 16 receives an instruction for activating the physical machine 1 from the personal computer 3 (at S211).

The NIC 16 outputs the activation instruction to the power-supply controller 19.

The power-supply controller 19 supplies electric power so that the physical machine 1 is activated (at S212).

The activation unit 177 receives an instruction for activating one of the VMs 2 and a VMID of the VM 2 through the NIC 16 (at S213).

The activation unit 177 activates the VM 2 of interest (at S214).

The VM kernel 17 associates a state of the VM 2 with the VMID and stores an "operating state" as the state of the VM 2 (at S215).

The generation unit 178 reads a transition period and the state corresponding to the VMID from the setting file 151 (at S216).

The generation unit 178 measures a period of time in which an instruction for operating the VM 2 is not received (at S217).

The generation unit 178 determines whether the personal computer 3 outputs an operation instruction (at S218).

When the determination is affirmative at S218, the process returns to S217.

When the determination is negative at S218, the generation unit 178 determines whether the measured period of time exceeds the transition period (at S219).

When the determination is negative at S219, the process returns to S218.

On the other hand, when the determination is affirmative at S219, the generation unit 178 generates an interruption instruction or a stop instruction (at S2110).

The generation unit 178 outputs the VMID and the generated interruption instruction or the generated stop instruction to the reception unit 171 (at S221).

The reception unit 171 receives the VMID and the interruption instruction or the stop instruction (at S222).

Note that, as described in the first embodiment, even when the personal computer 3 outputs the VMID of the VM 2 and an interruption instruction or a stop instruction, the generation unit 178 may generate an interruption instruction or a stop instruction.

The stopping unit 173 interrupts or stops the operation of the VM 2 of interest (at S223).

The VM kernel 17 stores the state of the VM 2 (at S224).

At S224, an "interruption/maintenance state" or a "stop/maintenance state" is associated with the VMID and stored.

The stopping unit 173 outputs the received VMID and the interruption instruction or the stop instruction to the continuance unit 172 (at S225).

The continuance unit 172 reads a duration time corresponding to the VMID from the time file 152 (at S226).

Note that, in this embodiment, a case where duration times stored in the time file 152 are used for individual VMs 2 irrespective of types of instructions, i.e., an interruption instruction and a stop instruction is described as an example, for simplicity of description.

The cancelling unit 176 determines whether the personal computer 3 output an instruction for activating the VM 2 corresponding to the VMID through the NIC 16 within the duration time (at S227).

When the determination is affirmative at S227, the process returns to S214.

By this, the operation of the VM 2 of interest is started again, and the operation of the physical machine 1 is continued.

Note that, although a case where the operation of the VM 2 is not started for the duration time until the instruction for activating the VM 2 is issued in response to an activation operation using the personal computer 3 is taken as an example, this case is merely an example and the present invention is not limited to this.

The activation unit 177 may, for example, perform an operation for activating the VM 2 when the activation unit 177 determines that an end of the interruption period or the stop period in the schedule file 154 has been reached within a duration time.

The activation unit 177 outputs an activation instruction, in response to an activation operation of the activation unit 177, to the VM 2 which is in the interruption/maintenance state or the stop/maintenance state and the cancelling unit 176.

The cancelling unit 176 cancels the "interruption/maintenance state" or the "stop/maintenance state", and activates the VM 2 again, and the operation of the physical machine 1 is continued.

When the determination is negative at S227, the continuance unit 172 determines whether the read duration time has been elapsed (at S228).

When the determination is negative at S228, the process returns to S227.

When the determination is affirmative at S228, the VM kernel 17 associates the state of the VM 2 with the VMID and stores an "interruption state" or a "stop state" as the state of the VM 2 (at S229).

The determination unit 175 determines whether all the other VMs 2 are in an "interruption state" or a "stop state" (at S231).

Specifically, the determination unit 175 makes the determination with reference to states of the VMs 2 stored in the VM kernel 17.

When the determination is negative at S231, the process returns to S213.

The processing described above is repeatedly performed, and substantially the same processing is performed on the other VMs 2 in parallel.

On the other hand, when the determination is affirmative at S231, the determination unit 175 obtains information on a current time from the timer unit 18 (at S232).

The determination unit 175 outputs the information on the current time to the timer setting unit 1711.

The timer setting unit 1711 reads an end of the stop period which comes after the current time from the schedule file 154 (at S233).

For example, in a case where information representing that a next stop period corresponds to a period of time from 12:00 to 12:30 is stored, a time point of 12:30 which is the end of the stop period is read.

The timer setting unit 1711 sets an activation timer of the timer 181 so that the physical machine 1 activates at the end of the stop period which has been read (at S234).

Since the activation timer is set as described above, the physical machine 1 is activated through the processes at S181 to S183.

After the timer setting unit 1711 sets the activation timer, the output unit 174 outputs an instruction for stopping the operation of the physical machine 1 to the VM kernel 17 (at S235).

The CPU 11 stops the operation of the physical machine 1 in response to the stop instruction issued from the VM kernel 17 (at S236).

In this way, even when the VM 2 is activated during the stop period of the physical machine 1 in accordance with the schedule file 154, power consumption is reduced by setting the VM 2 to be the "stop state" again in accordance with use of the VM 2.

The fourth embodiment is characterized as described above, and other configurations of the fourth embodiment are substantially the same as those of the first to third embodiments. Therefore, like components are denoted by like reference numerals, and descriptions thereof are omitted.

A fifth embodiment relates to a configuration in which data in a schedule file 154 is changed in accordance with a history.

Figure 24:
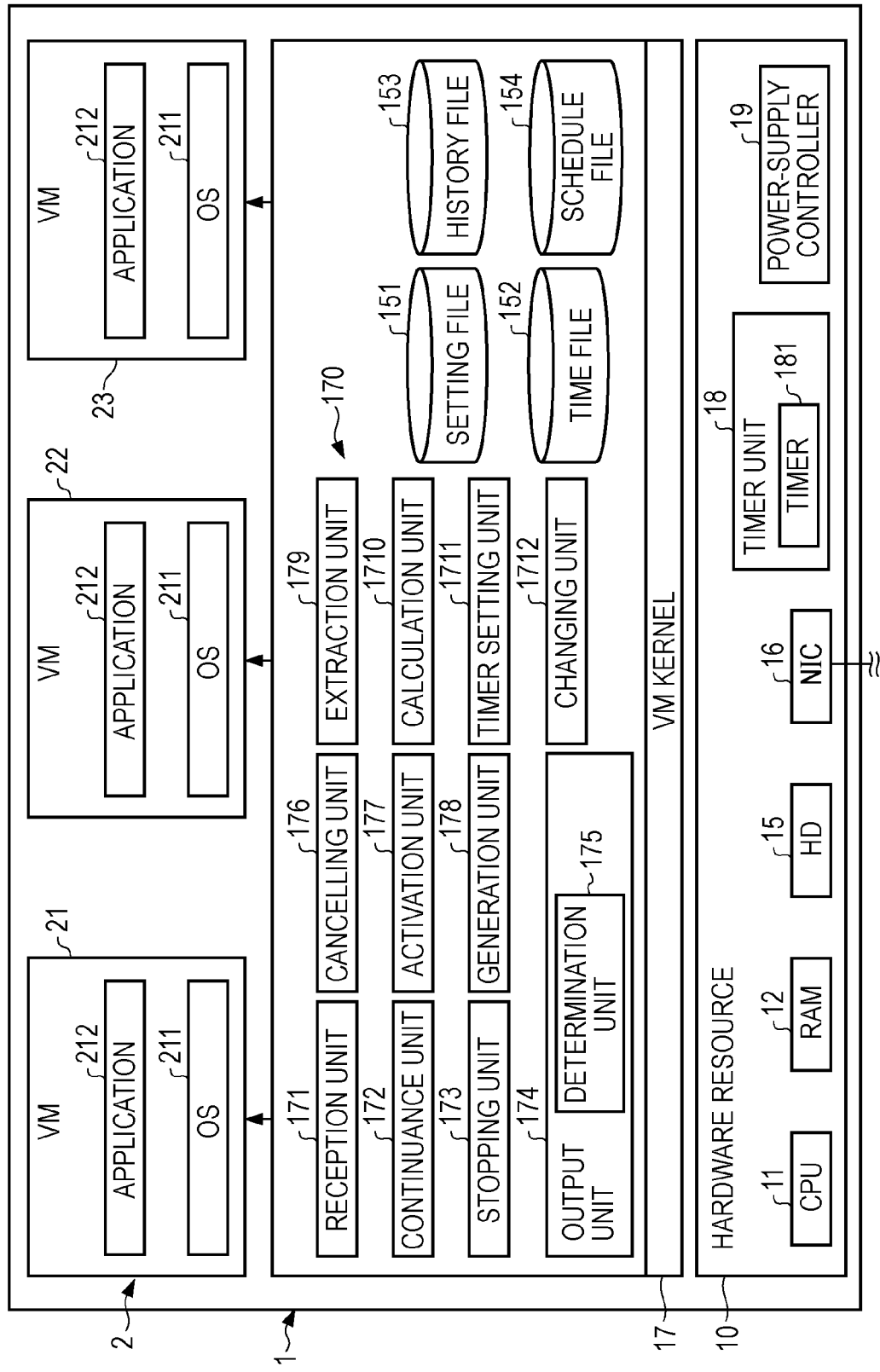
FIG. 24 illustrates hardware and software of a physical machine and VMs according to a fifth embodiment.

FIG. 24 is a block diagram illustrating hardware and software of a physical machine 1 and VMs 2 according to the fifth embodiment.

A changing unit 1712 is provided in addition to the configuration of the fourth embodiment.

The changing unit 1712 refers to a history file 153 and changes time information of the VMs 2 and the physical machine 1.

First, processing of changing the time information of the VMs 2 stored in the schedule file 154 will be described.

The changing unit 1712 reads past interruption periods and past stop periods of one of the VMs 2 from the history file 153, and extracts a period of time in which the interruption periods overlap with each other or a period of time in which the stop periods overlap with one another.

The changing unit 1712 stores the extracted period of time as an interruption period or a stop period in the schedule file 154.

In this embodiment, a case where interruption periods and stop periods for a predetermined number of past days (for past three days, for example) are used for the change will be described as an example.

Figure 25:
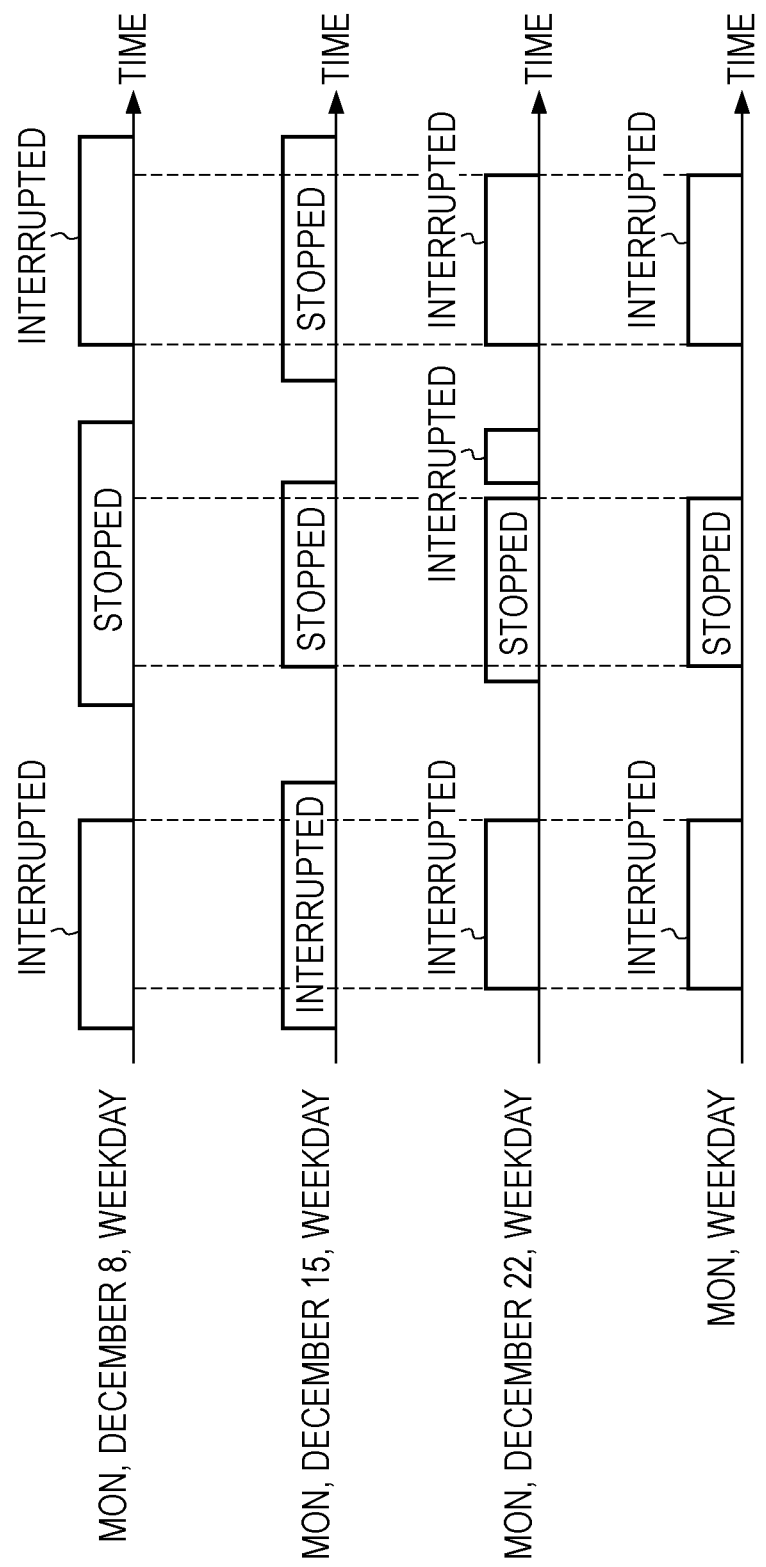
FIG. 25 illustrates changes of interruption periods and stop periods of a VM.

FIG. 25 illustrates changes of interruption periods and stop periods of the VM 2.

In FIG. 25, interruption periods and stop periods of Monday, December 8, Monday, December 15, and Monday, December 22 which are weekday-Mondays in past three weeks are shown from above as an example.

Furthermore, interruption periods and stop periods of weekday-Monday after changing processing is performed are shown in the lowermost line.

Axes of abscissa denote time.

The changing unit 1712 refers to the history file 153 and extracts interruption periods and stop periods of the VM 2 of interest for three days.

The changing unit 1712 extracts a period of time in which the interruption periods of Monday, December 8, Monday, December 15, and Monday, December 22 overlap with one another as an interruption period obtained after changing processing.

The changing unit 1712 associates the extracted interruption period obtained after the changing processing with a VMID and stores the interruption period in the schedule file 154.

For example, when an interruption period of the VM 21 corresponds to a period of time from 12:00 to 1:00, an interruption period of the VM 22 corresponds to a period of time from 11:00 to 2:00, and an interruption period of the VM 23 corresponds to a period of time from 12:30 to 1:10, a period of time from 12:30 to 1:00 is extracted as an overlapping interruption period.

Similarly, the changing unit 1712 extracts a period of time in which stop periods of Monday, December 8, Monday, December 15, and Monday, December 22 overlap one another as a stop period obtained after changing processing.

The changing unit 1712 associates the stop period obtained after the changing processing with the VMID and stores the stop period in the schedule file 154.

Furthermore, when the interruption periods and the stop periods of Monday, December 8, Monday, December 15, and Monday, December 22 overlap with one another, a period of time in which the interruption periods and the stop periods of Monday, December 8, Monday, December 15, and Monday, December 22 overlap with one another is extracted as an interruption period obtained after changing processing.

The changing unit 1712 associates the interruption period obtained after changing processing with the VMID and stores the interruption period in the schedule file 154.

For example, if an interruption period of Monday, December 8, a stop period of Monday, December 15, and an interruption period of Monday, December 22 overlap with one another, the overlapping period is stored as an interruption period in the schedule file 154.

The changing unit 1712 performs the processing described above also for the other weekdays.

Similarly, the changing unit 1712 performs the processing described above also for days other than weekdays such as Saturday, Sunday and a public holiday.

Specifically, a period of time in which interruption periods (stop periods) on Saturdays for a number of past weeks overlap with one another is extracted.

Furthermore, as for public holidays, a period of time in which interruption periods (stop periods) on several past public holidays overlap with one another is extracted.

Alternatively, a period of time in which interruption periods (stop periods) for five days of weekdays from Monday to Friday overlap with one another may be determined as an interruption period (stop period) obtained after changing processing.

Furthermore, a period of time in which interruption periods (stop periods) of Saturday, Sunday, and public holidays overlap with one another may be determined as an interruption period obtained after changing processing.

The processing described above is executed by each of the VMs 2.

By this, the data in the schedule file 154 shown in FIG. 17 is changed in accordance with histories of past interruption periods and past stop periods.

Next, change of interruption periods and stop periods of the physical machine 1 will be described.

The changing unit 1712 changes the interruption periods and stop periods of the physical machine 1 in accordance with the interruption periods and the stop periods of all the VMs 2 stored in the schedule file 154.

Figure 26:
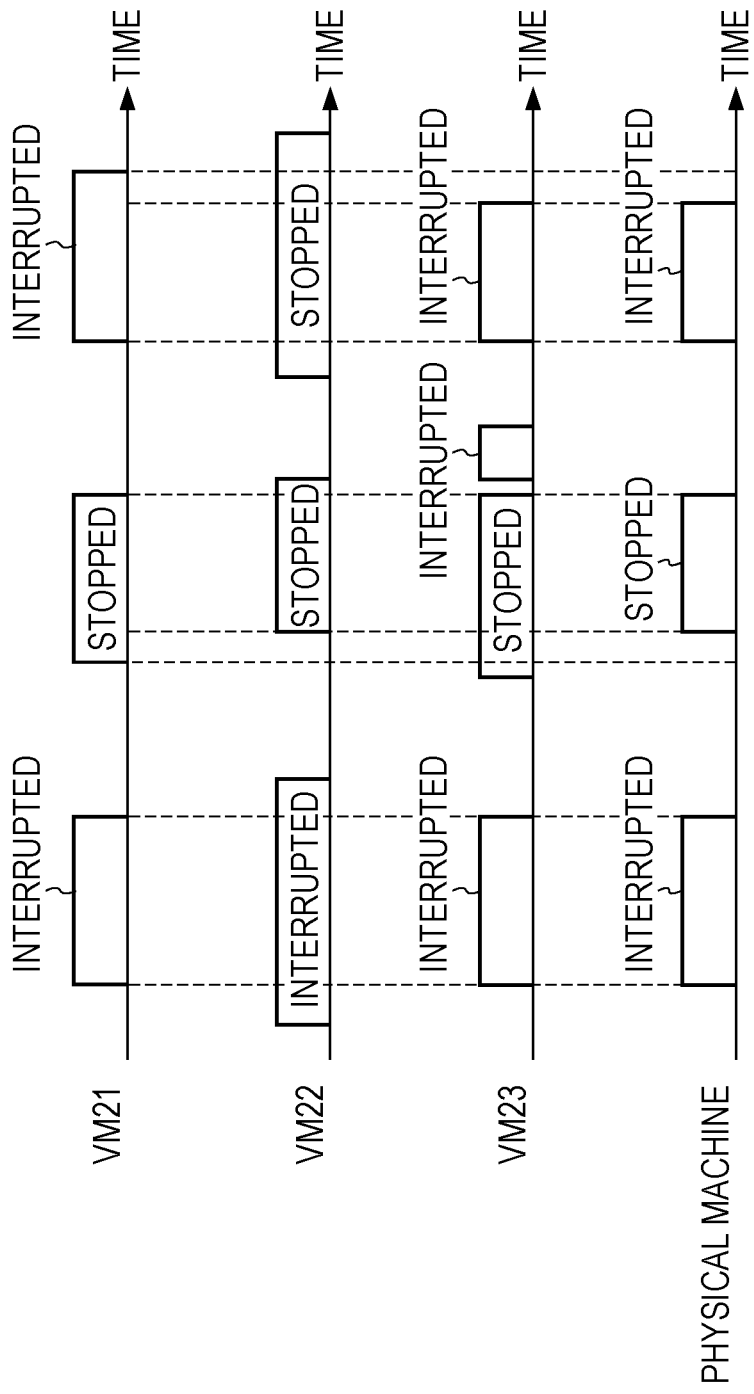
FIG. 26 illustrates changes of interruption periods and stop periods of VMs and the physical machine.

FIG. 26 illustrates changes of the interruption periods and the stop periods of VMs 2 and the physical machine 1.

In FIG. 26, changes of the interruption periods and the stop periods of the VMs 21 to 23 obtained after changing processing are shown from above.

The changes of the interruption periods and the stop periods of the physical machine 1 obtained after changing processing are shown in the lowermost line.

Axes of abscissa denote time.

The changing unit 1712 reads interruption periods and stop periods of the VMs 21 to 23 obtained after the changing processing from the schedule file 154.

The changing unit 1712 extracts a period of time in which the interruption periods of the VMs 21 to 23 overlap with one another as shown in FIG. 26.

Then, the changing unit 1712 stores the extracted period of time obtained after the changing processing as an interruption period of the physical machine 1 in the schedule file 154.

Furthermore, the changing unit 1712 extracts a period of time in which the stop periods of the VMs 21 to 23 overlap with one another.

Then, the changing unit 1712 stores the extracted period of time obtained after the changing processing as a stop period of the physical machine 1 in the schedule file 154.

Note that, although a case where both the interruption periods and the stop periods are changed is described as an example in this embodiment, only one of them may be changed.

Moreover, the changing unit 1712 extracts a period of time in which the interruption periods and the stop periods of the VMs 21 to 23 overlap with one another from the schedule file 154, data in the schedule file 154 being changed.

In the example shown in FIG. 26, an interruption period of the VM 21, an interruption period of the VM 23, and a stop period of the VM 22 overlap with one another for a certain period of time.

In this case, the changing unit 1712 stores the extracted period of time in which the interruption periods and the stop period overlap with one another as an interruption period of the physical machine 1 in the schedule file 154.

That is, a period of time in which an interruption period and a stop period overlap with each other is stored as an interruption period so that rapid activation is preferentially performed.

Figure 27:
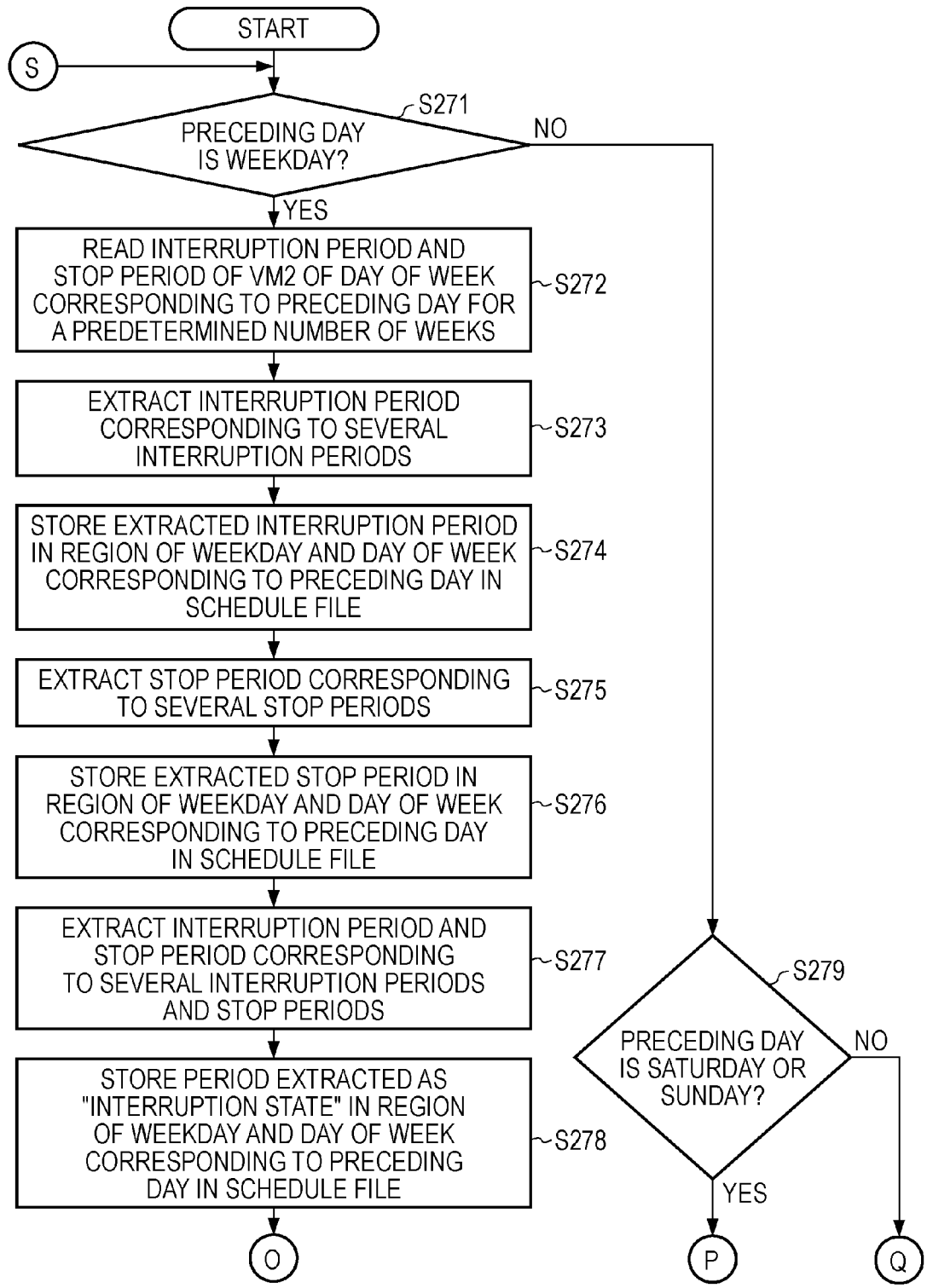
FIG. 27 is a flowchart illustrating a procedure of processing of changing data in a schedule file corresponding to one of the VMs.
Figure 28:
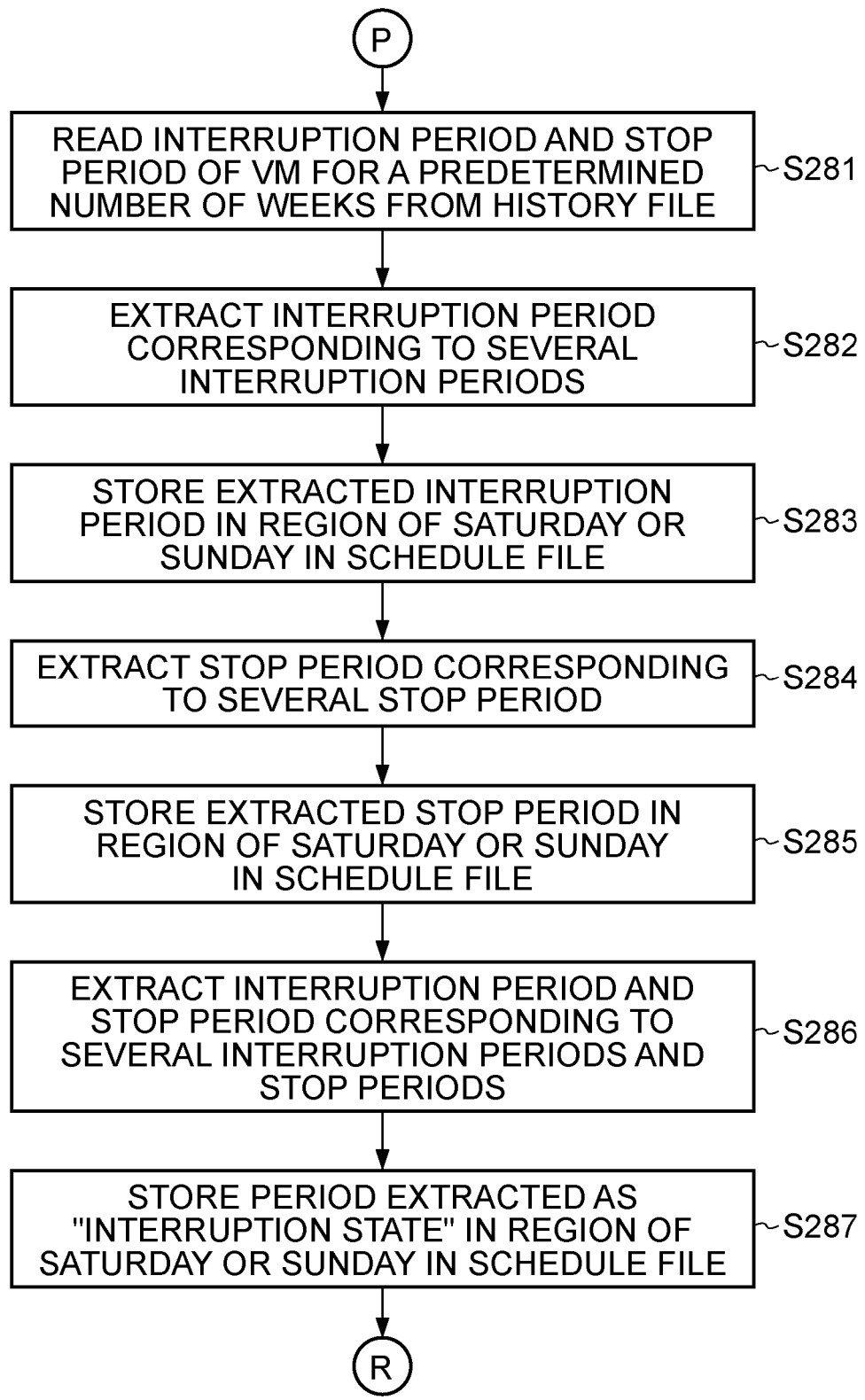
FIG. 28 is a continuation of the flowchart in FIG. 27 illustrating the procedure of processing of changing data in the schedule file corresponding to one of the VMs.
Figure 29:
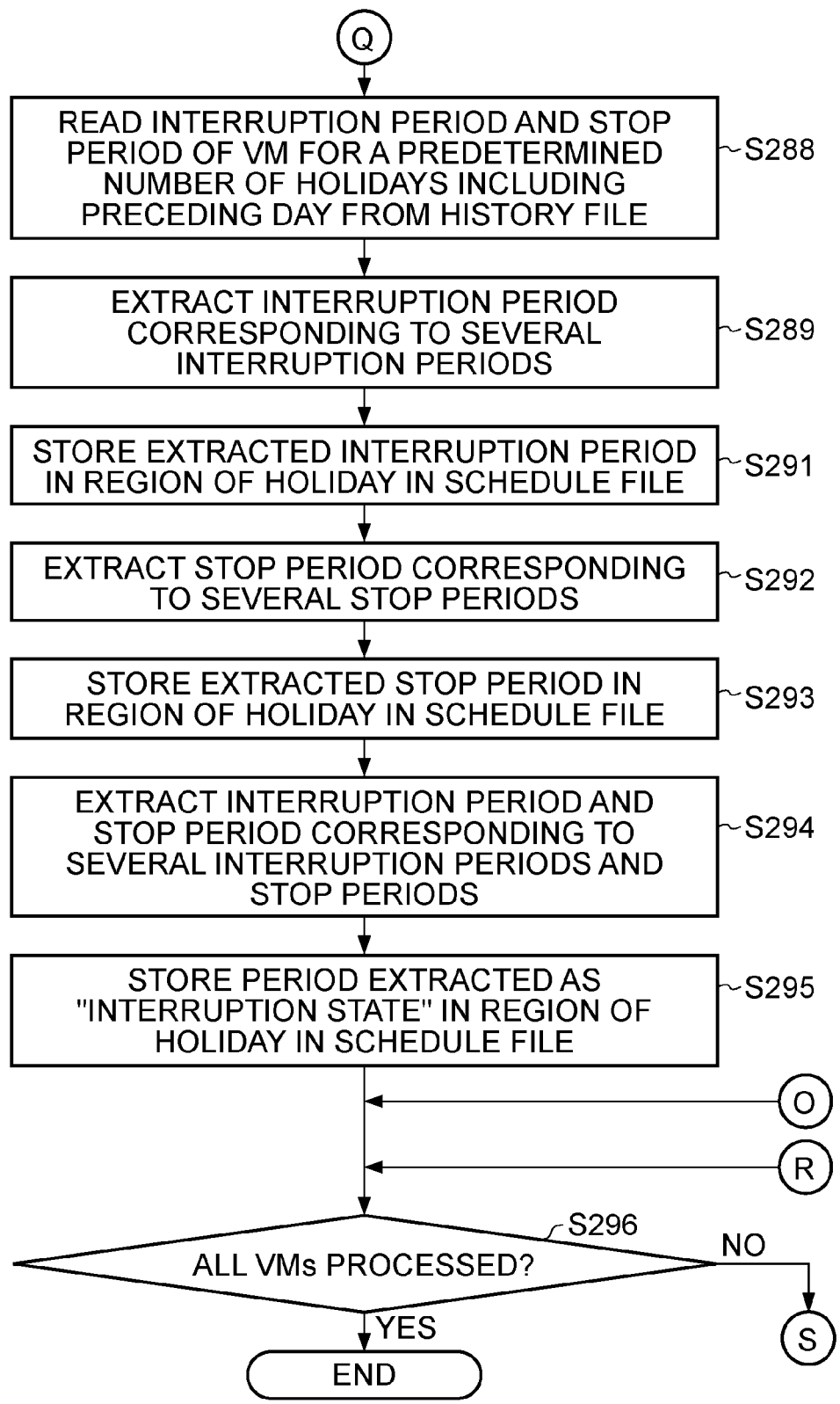
FIG. 29 is a continuation of the flowchart in FIG. 27 illustrating the procedure of processing of changing data in the schedule file corresponding to one of the VMs.

FIGS. 27 to 29 are flowcharts illustrating a procedure of the processing for changing the data in the schedule file 154 of one of the VMs.

The changing unit 1712 refers to information on time, information on a date, information on a day of a week, and information representing whether the day is a public holiday, and determines whether the physical machine 1 is activated first after a date is changed.

When the determination is affirmative, the changing unit 1712 performs processing below so as to change the data in the schedule file 154 with reference to the history file 153 of the VMs 2 stored by a preceding day.

Note that, although a case where changing processing is performed at the beginning of a day will be described, this is merely an example and the present invention is not limited to this.

The changing processing may be appropriately performed every month, every Friday, or every six hours, for example.

The changing unit 1712 determines whether the previous day is a weekday (at S271).

When the determination is affirmative at S271, the changing unit 1712 reads interruption periods and stop periods corresponding to a day of a week of the preceding day of the VM 2 for the predetermined number of weeks from the history file 153 (at S272).

The changing unit 1712 extracts a period of time in which a plurality of interruption periods of different days overlap with one another as an interruption period (at S273).

The changing unit 1712 associates the extracted interruption period with a VMID corresponding to the VM 2 and stores information on the interruption period in a region for the day of a week corresponding to the preceding day which is a weekday in the schedule file 154 (at S274).

The changing unit 1712 extracts a period of time in which a plurality of stop periods of different days overlap with one another as a stop period (at S275).

The changing unit 1712 associates the extracted stop period with the VMID corresponding to the VM 2 and stores information on the stop period in a region for the day of a week corresponding to the preceding day which is a weekday in the schedule file 154 (at S276).

The changing unit 1712 extracts a period of time in which interruption periods and stop periods of different days overlap with one another (at S277).

The changing unit 1712 stores information on the extracted period of time as an "interruption state" in a region for the day of a week corresponding to the preceding day which is a weekday in the schedule file 154 (at S278).

When the determination is negative at S271, the changing unit 1712 determines whether the preceding day is Saturday or Sunday (at S279).

When the determination is affirmative at S279, the changing unit 1712 reads interruption periods and stop periods corresponding to the day of a week of the preceding day of the VM 2 for a predetermined number of weeks from the history file 153 (at S281).

The changing unit 1712 extracts a period of time in which a plurality of interruption periods of different days overlap with one another as an interruption period (at S282).

The changing unit 1712 associates the extracted interruption period with the VMID and stores the interruption period in a region for Saturday or Sunday in the schedule file 154 (at S283).

The changing unit 1712 extracts a period of time in which a plurality of stop periods overlap with one another as a stop period (at S284).

The changing unit 1712 associates the extracted stop period with the VMID and stores the stop period in a region for Saturday or Sunday in the schedule file 154 (step S285).

The changing unit 1712 extracts a period of time in which interruption periods and stop periods of different days overlap with one another (at S286).

The changing unit 1712 stores information on the extracted period of time as an "interruption state" in a region for Saturday or Sunday in the schedule file 154 (at S287).

When the determination is negative at S279, the changing unit 1712 determines the preceding day is a public holiday, and reads interruption periods and stop periods of the VM 2 for a predetermined number of public holidays including the preceding day from the history file 153 (at S288).

The changing unit 1712 extracts a period of time in which interruption periods of different public holidays overlap with one another as an interruption period (at S289).

The changing unit 1712 associates the extracted interruption period with the VMID and stores information on the interruption period in a region for the public holidays in the schedule file 154 (at S291).

The changing unit 1712 extracts a period of time in which stop periods of different public holidays overlap with one another (at S292).

The changing unit 1712 associates the extracted stop period with the VMID and stores information on the stop period in a region for the public holidays in the schedule file 154 (at S293).

The changing unit 1712 extracts interruption periods and stop periods in which interruption periods and stop periods of different public holidays overlap with one another (at S294).

The changing unit 1712 stores information on a period of time extracted as an "interruption state" in a region for the public holidays in the schedule file 154 (at S295).

After the processes at S295, S278, and S287 are performed, the changing unit 1712 determines whether all the VMs 2 have been processed (at S296).

When the determination is negative at S296, the process returns to S271, and the processing described above is performed again.

When the determination is affirmative at S296, the series of processes is terminated.

Figure 30:
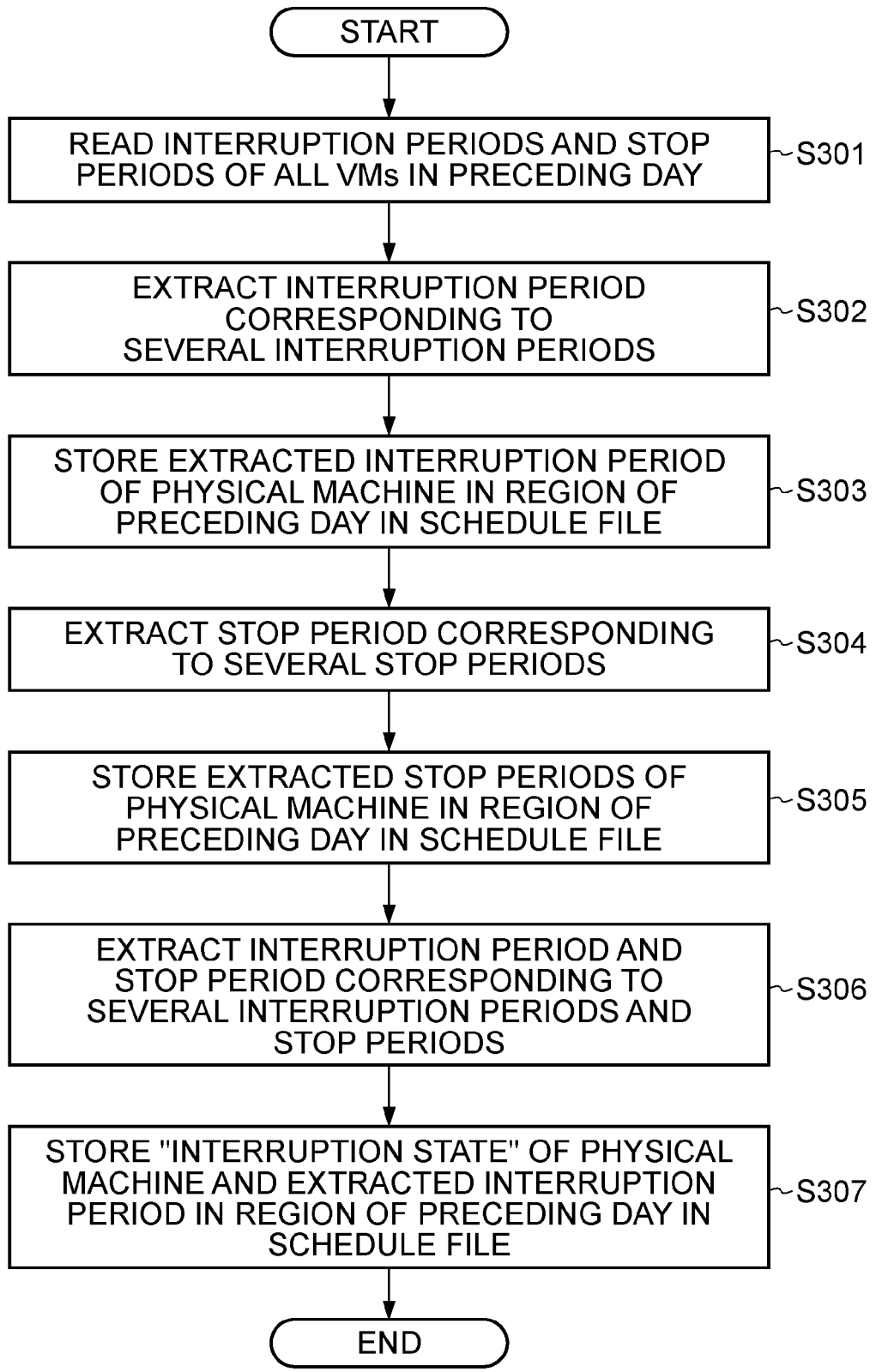
FIG. 30 is a flowchart illustrating a procedure of processing of changing data in the schedule file corresponding to the physical machine.

FIG. 30 is a flowchart illustrating a procedure of processing of changing content which associates with the physical machine 1 in the schedule file 154.

After the processing of changing the data which associates with the VMs 2 in the schedule file 154 is performed, processing of changing data which associates with the physical machine 1 is performed as follows.

The changing unit 1712 reads the interruption periods and the stop periods of the preceding day of all the VMs 2 from the schedule file 154 (at S301).

The changing unit 1712 extracts a period of time in which the read interruption periods of the different VMs 2 overlap with one another as an interruption period (at S302).

The changing unit 1712 stores interruption periods of the physical machine 1 extracted from the schedule file 154 in the preceding day (at S303).

The changing unit 1712 extracts a period of time in which the read stop periods of the different VMs 2 overlap with one another as a stop period (at S304).

The changing unit 1712 stores the stop period of the physical machine 1 which is extracted in the preceding day from the schedule file 154 (at S305).

The changing unit 1712 extracts a period of time in which the read interruption periods and the read stop periods of the different VMs 2 overlap with one another (at S306).

The changing unit 1712 stores an "interruption state" of the physical machine 1 in a region corresponding to the preceding day in the schedule file 154, and further stores the extracted interruption period of the physical machine 1 (at S307).

By this, the schedule file 154 in accordance with use of the VMs 2 is configured.

Furthermore, the schedule file 154 of the physical machine 1 which controls the VMs 2 in accordance with the use of the VMs 2 may be optimized.

Moreover, since the schedule file 154 of the physical machine 1 is updated in accordance with the use of the VMs 2, use of the VMs 2 on weekdays, Saturdays, Sundays, and public holidays are taken into consideration.

The fifth embodiment is characterized as described above, and other configurations of the fifth embodiment are substantially the same as those of the first to fourth embodiments. Therefore, like components are denoted by like reference numerals, and descriptions thereof are omitted.

Figure 31:
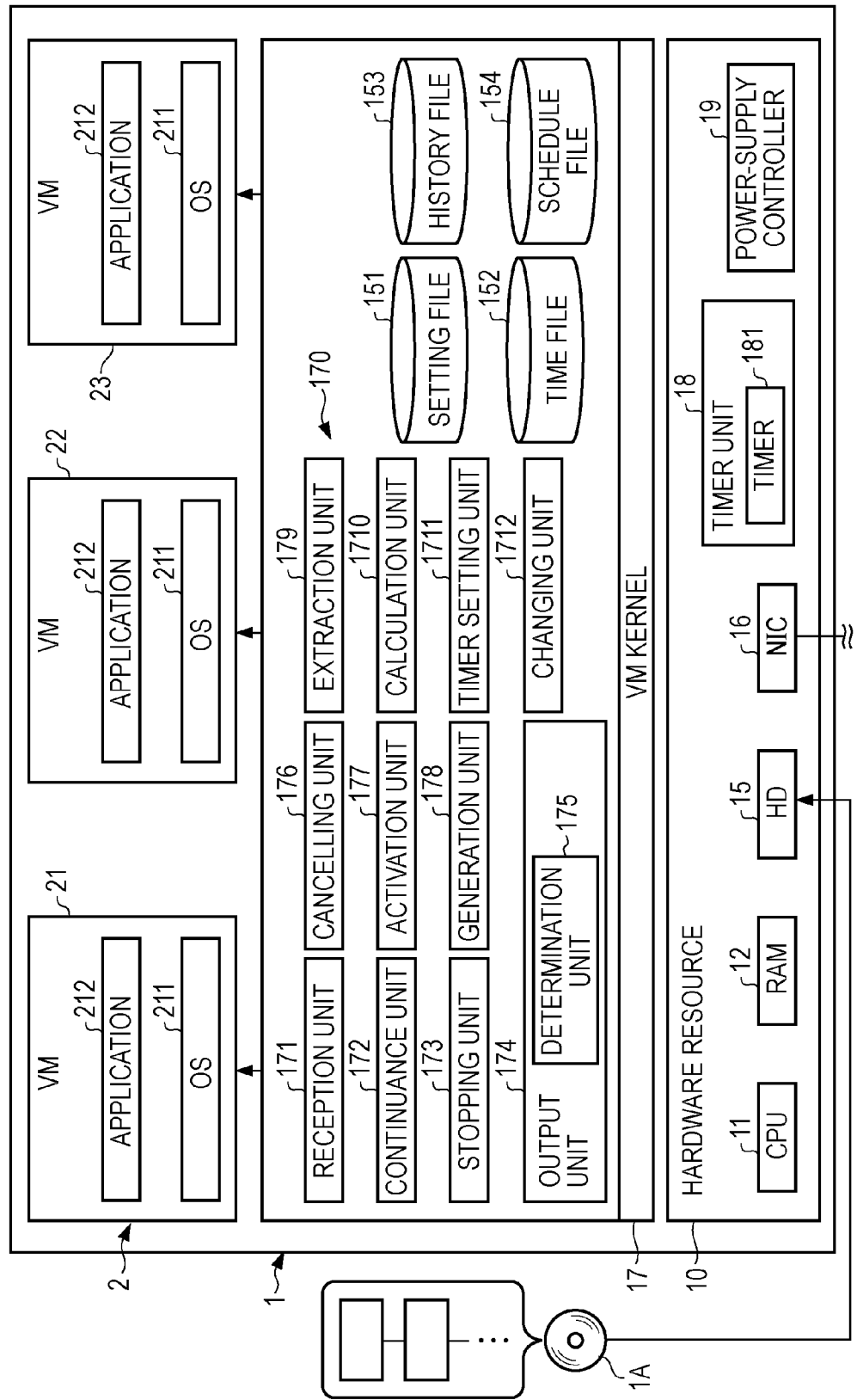
FIG. 31 illustrates hardware and software of a physical machine and VMs according to a sixth embodiment.

FIG. 31 is a block diagram illustrating hardware and software of a physical machine 1 and VMs 2 according to a sixth embodiment.

A program used to operate the physical machine 1 according to the first to fifth embodiments may be stored in a HD 15 by reading a portable recording medium 1A such as a CD-ROM using a reading unit (not shown).

Furthermore, the program may be downloaded from a server computer (not shown) which is connected through a communication network such as the Internet.

Such a system will be described hereinafter.

The physical machine 1 shown in FIG. 31 receives an interruption instruction or a stop instruction, and downloads a program used to continue operation of the physical machine 1 for a certain duration time, for example, from a server computer (not shown) through the portable recording medium 1A or the communication network.

The program is installed as a control module 170 and is loaded in a RAM 12 to be executed.

By this, the physical machine 1 functions as described above.

The sixth embodiment is characterized as described above, and other configurations of the sixth embodiment are substantially the same as those of the first to fifth embodiments. Therefore, like components are denoted by like reference numerals, and descriptions thereof are omitted.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A non-transitory computer readable medium on which is encoded a computer program executable by a computer to control a virtual machine, the computer program includes computer executable instructions that cause the computer to execute a process comprising:

obtaining data indicating an interruption period or a stop period of the virtual machine which is stored in the storage device, the interruption period or the stop period representing a duration time of an interruption or a stopping of the virtual machine and including a time point when operation of the virtual machine is to be interrupted or stopped;

retrieving, from the storage device, data indicating a stop period of the computer, the stop period of the computer representing a duration time of a stop state of the computer and including a time point when operation of the computer is to be stopped;

setting a timer used to activate the computer at a time point before the end of the retrieved stop period;

stopping the operation of the computer after the timer is set; and activating, when the interruption period or the stop period of the virtual machine is terminated, the virtual machine corresponding to the terminated interruption period or the terminated stop period.

2. The non-transitory computer readable medium according to claim 1, wherein the process for execution by the computer further comprises:

storing, in the storage device, interruption histories or stop histories representing periods of time from when the virtual machine enters an interruption state or a stop state to when the virtual machine enters another state in response to an instruction for interrupting operation of the virtual machine or an instruction for stopping operation of the virtual machine; and changing the interruption period or the stop period stored in the storage device in accordance with the stored interruption histories or the stored stop histories.

3. The non-transitory computer readable medium according to claim 2, wherein the process for execution by the computer further comprises:

obtaining a first set interruption histories or stop histories for an arbitrary number of days from the interruption histories or the stop histories stored in the storage device;

extracting a second set of interruption histories or stop histories including periods of time which overlap with one another from among the obtained first set of interruption histories or stop histories; and changing the interruption period or the stop period of the virtual machine stored in the storage device in accordance with the extracted second set of interruption histories or the extracted stop histories.

4. The non-transitory computer readable medium according to claim 1, wherein the process for execution by the computer further comprises:

obtaining interruption periods and stop periods of a plurality of virtual machines which are registered as virtual machines operating in the computer, the interruption periods and the stop periods being stored in the storage device, each interruption or stop period representing a time duration of an interruption state or a stop state of a corresponding one the plurality of virtual machines and including a time point when operation of the corresponding virtual machine is to be interrupted or stopped;

extracting a period of time in which the obtained interruption periods or the obtained stop periods of the plurality of virtual machines overlap with one another; and changing a stop period or an interruption period of the computer stored in the storage device in accordance with the extracted period of time.

* * * * *